United States Patent
Takizawa et al.

(10) Patent No.: US 6,845,832 B2
(45) Date of Patent: Jan. 25, 2005

(54) ENGINE SYSTEM, OPERATING METHOD THEREFOR, AND ENGINE STARTING APPARATUS

(75) Inventors: Kazuaki Takizawa, Utsunomiya (JP); Tatsuya Fukushima, Utsunomiya (JP); Katsuya Minami, Utsunomiya (JP); Masato Fujioka, Kawachi-gun (JP); Kazuo Ooyama, Tokyo (JP); Eijiro Shimabukuro, Utsunomiya (JP); Junya Tachikawa, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/295,921

(22) Filed: Nov. 18, 2002

(65) Prior Publication Data

US 2003/0094317 A1 May 22, 2003

(30) Foreign Application Priority Data

Nov. 22, 2001 (JP) .......................................... 2001-358071
Jun. 14, 2002 (JP) .......................................... 2002-174618

(51) Int. Cl.$^7$ .............................................. B60K 17/28
(52) U.S. Cl. ...................................... 180/53.8; 475/287
(58) Field of Search .............................. 180/53.8, 65.1, 180/65.2, 65.3, 65.4; 475/287, 324

(56) References Cited

U.S. PATENT DOCUMENTS 6,048,288 A * 4/2000 Tsujii et al. .................... 477/5
6,672,415 B1 * 1/2004 Tabata ........................ 180/65.2

FOREIGN PATENT DOCUMENTS

| JP | 05-294163 | 11/1993 |
| JP | 07-195955 | 8/1995 |
| JP | 11-230012 | 8/1999 |
| JP | 2000-120463 | 4/2000 |
| JP | 2002-309983 | 10/2002 |
| JP | 2003-002045 | 1/2003 |
| JP | 2003-138956 | 5/2003 |
| JP | 2003-139026 | 5/2003 |

* cited by examiner

Primary Examiner—Faye M. Fleming
(74) Attorney, Agent, or Firm—Westerman, Hattori, Daniels & Adrian, LLP

(57) ABSTRACT

The present invention is made to operate auxiliary machine while an engine is stopped, to start an engine and to charge a battery by providing a single motor and a simple construction and by providing a simple control operation. An engine system comprises an engine, a motor, and auxiliary machine, and further comprises a planetary mechanism having three elements comprising a sun gear, a carrier and a ring gear, to which any one of an output shaft of the engine, an output shaft of the motor and a drive shaft of the auxiliary machine are respectively connected, a uniting connection device capable of uniting two or more elements of the planetary mechanism, and a rotation direction restriction device which restricts a rotation direction of the drive shaft of the auxiliary machine to one direction.

11 Claims, 15 Drawing Sheets

Fig. 20

| | UNIFYING CLUTCH (10) | W1 (11) | W2 (13) | COMPRESSOR CLUTCH (39) | MOTOR |
|---|---|---|---|---|---|
| ENGINE STOPPED, AC OFF | OFF | — | — | — | STOPPED STOPPED |
| ENGINE STOPPED, AC ON | OFF | FREE | LOCK | ON | REVERSE ELECTRIC DRIVE |
| ENGINE START | OFF | LOCK | FREE | — | FORWARD ELECTRIC DRIVE |
| ENGINE OPERATING AC ON | ON | FREE | FREE | ON | FORWARD GENERATING OR ELECTRIC DRIVE |
| ENGINE OPERATING, AC OFF | ON | FREE | FREE | OFF | FORWARD GENERATING OR ELECTRIC DRIVE |

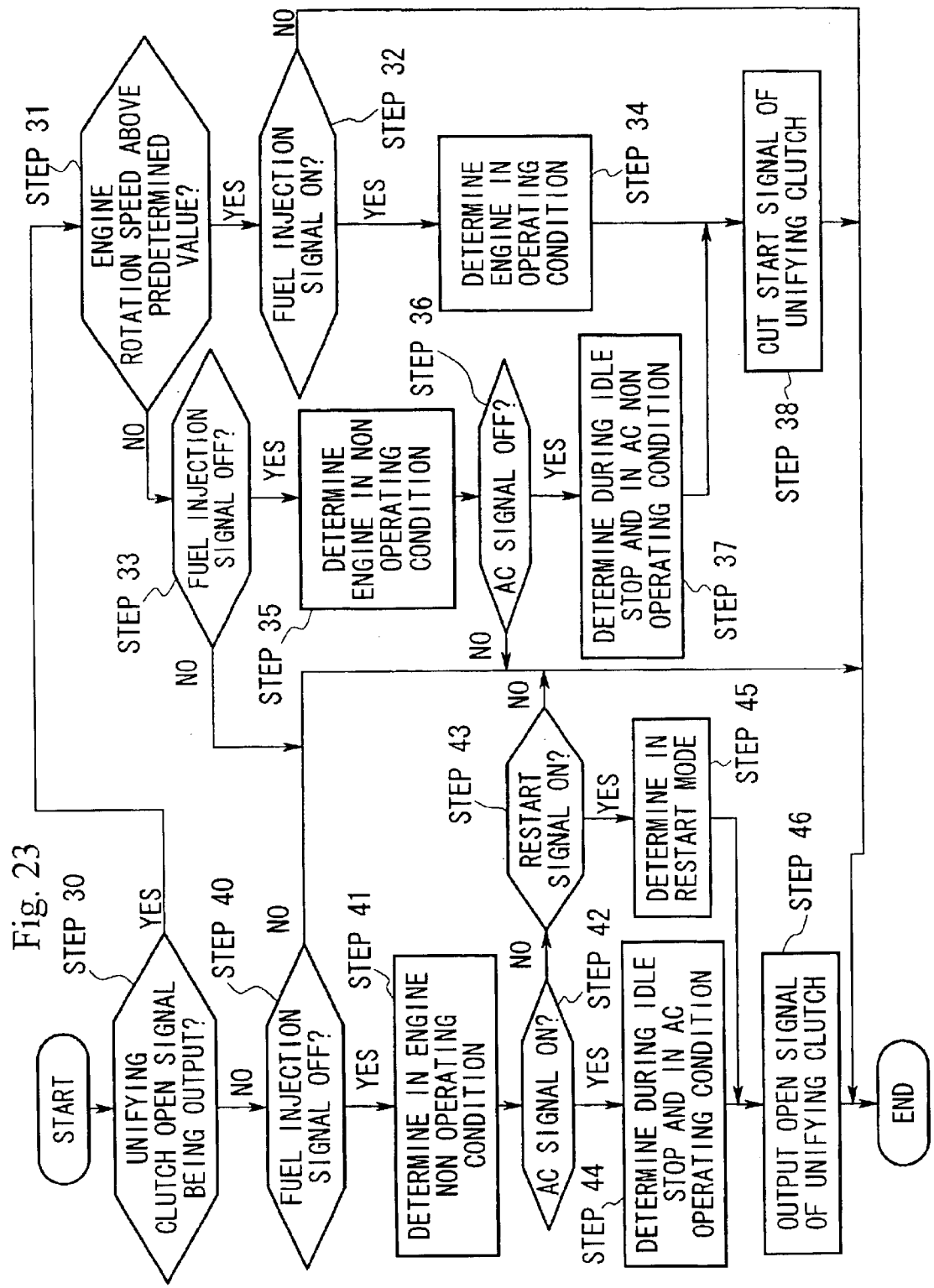

Fig. 24

| | UNIFYING CLUTCH (10) | W1 (11) | W2 (13) | COMPRESSOR CLUTCH (39) | MOTOR |
|---|---|---|---|---|---|
| ENGINE STOPPED, AC OFF | CONNECTED (OFF) | — | — | — | STOPPED   STOPPED |
| ENGINE STOPPED, AC ON | OPEN (ON) | FREE | LOCK | ON | REVERSE ELECTRIC DRIVE |
| ENGINE START | OPEN (ON) | LOCK | FREE | — | FORWARD ELECTRIC DRIVE |
| ENGINE OPERATING, AC ON | CONNECTED (OFF) | FREE | FREE | ON | FORWARD GENERATING OR ELECTRIC DRIVE |
| ENGINE OPERATING, AC OFF | CONNECTED (OFF) | FREE | FREE | OFF | FORWARD GENERATING OR ELECTRIC DRIVE |

ENGINE SYSTEM, OPERATING METHOD THEREFOR, AND ENGINE STARTING APPARATUS

BACKGROUND OF THE INVENTION

1. Field of the Invention

The present invention relates to an engine system, in particular, relates to an engine system for a vehicle, which uses an engine as one of driving sources, and an operating method therefor and an engine starting apparatus.

2. Description of the Related Art

In general, the engine of a vehicle is started by activating a starter motor using a battery as the power source, and after combustion has once commenced, the engine is used as a drive source for propelling the vehicle and for operating various auxiliary machine. One example of auxiliary machines provided in the vehicle is, for example, a compressor for an air conditioner, a pump for a power steering, a oil pump for an automatic transmission, a vacuum pump, for a brake system and the like.

Conventionally, in such a vehicle using the engine as an only drive source for the auxiliary machine, the auxiliary machine could not driven while the engine is stopped.

However, recently with the purpose of improving fuel efficiency and reducing $CO_2$, based on a view point of so called energy conservation, attention is being paid to a hybrid vehicle, which stops the engine in a light load region or while the vehicle is stopped and which travels by motor by regenerative electric power or electric power generated while the engine is operating.

Moreover, an idle stop vehicle has been proposed recently, which automatically stops the engine while the vehicle is stopped and stops the fuel injection while idling in order to thereby improve the fuel consumption and also reduces $CO_2$.

In these hybrid vehicle and idle stop vehicle, since the engine is stopped while the vehicle is stopped, for example while waiting for a traffic signal or during a traffic jam or the like, even while the engine is stopped it is still necessary to operate the air conditioner to continue the air-conditioning the interior. Moreover, in a hybrid vehicle, while travelling by motor with the engine in the stopped condition, it is still necessary to operate no only the air conditioner but also all of the auxiliary machines necessary for travelling.

A method of operating an air conditioner in a hybrid vehicle while the engine is stopped is disclosed, for example, in Japanese Patent No. 3180506. In this method, an auxiliary motor is installed in the compressor of an air conditioner, for driving the compressor, and when the remaining battery charge is high, the compressor is driven by the auxiliary motor, while when the remaining battery charge is low, the engine which is linked to the operation of the air conditioner is shifted from a stopped condition to a drive condition, so that the compressor of the air conditioner is driven using the engine as the drive source.

However, installation of an auxiliary motor in the compressor with the sole purpose of driving the compressor increases the number of parts and also increases the product cost, and thus undesirable.

Furthermore, in Japanese Unexamined Patent Application, First Publication No. 2000-120463, there is disclosed an engine system where an engine starting motor is connected via a planetary mechanism and a belt and pulley to an engine and auxiliary machines, and a clutch is provided with the engine output shaft so that it is possible to switch connection or disconnection of the transmission of the torque from the motor to the engine. According to this engine system, by disconnecting the clutch and allowing only torque transmission from the motor to the auxiliary machine, the auxiliary machine can be driven even when the engine is stopped.

However, provision of a clutch with the engine crank shaft increases the length in the direction along the output shaft of the engine system and causing a big problem when there is a restriction on the engine installation space.

Moreover, in order to switch from starting the engine by the motor to driving of the auxiliary machine by the motor, switching of the clutch mounted to the engine output shaft, and switching of the brake provided with the ring gear of the planetary mechanism mounted to the motor must be performed at the same time, which result in causing the problem that construction becomes complex and the control operation thereof becomes complicated.

SUMMARY OF THE INVENTION

The present invention addresses the abovementioned situation, with the object of providing an engine system and engine starting apparatus capable of achieving drive of auxiliary machine while an engine is stopped, starting of the engine, and charging of a battery, by means of a single motor and a simple construction and control.

In order to achieve the above object, the present invention proposes the following devices and operation methods.

A first aspect of the invention provides an engine system comprising an engine, a motor and an auxiliary machine (for example, compressor 4 in the embodiment of the invention), and also comprising: a planetary mechanism having three elements comprising a sun gear, a carrier and a ring gear to which are respectively connected any one of an engine output shaft, a motor output shaft and an auxiliary machine drive shaft; a uniting connection device (clutch 10 in the embodiment of the invention) capable of uniting two or more elements of the planetary mechanism; and a rotation direction restriction device (one-way clutch 11 in the embodiment of the invention) which restricts a rotation direction of the auxiliary machine drive shaft to one direction.

In this aspect of the invention, when the engine is started from an engine stop condition, the coupling condition by the connection device of the two or more elements of the planetary mechanism is released, and the planetary mechanism attains a differential condition where the respective elements can rotate freely, and the motor is driven so that the rotation direction of the auxiliary machine drive shaft becomes the direction which is restricted by the rotation direction restriction device. As a result, the elements connected to the engine output shaft are rotated following the rotation of the elements connected to the motor output shaft. By setting the gear ratio between the elements connected to the motor output shaft and the elements connected to the engine output shaft to a predetermined value, the torque of the motor is transmitted to the engine in a condition which has been amplified corresponding to this gear ratio, and the engine is started.

In driving the auxiliary machine in an engine stopped condition, the coupling condition by the connection device of the elements constituting the planetary mechanism is made a released condition, and the motor is driven so that the drive direction of the auxiliary machine drive shaft becomes a direction for which rotation is allowed by the rotation direction restriction device. As a result, the torque of the motor is transmitted to the elements connected to the engine output shaft, and to the elements connected to the auxiliary machine drive shaft. However in the case where the friction torque of the engine is large compared to the drive torque of the auxiliary machine, the auxiliary machine drive shaft is rotated with the engine output shaft held in the stopped condition, so that the auxiliary machine is driven.

Moreover, in the case of driving the auxiliary machine during engine operation, the two or more elements of the planetary mechanism are united by the connection device, and the auxiliary machine drive shaft is rotated in a direction for which rotation is permitted by the rotation direction restriction device. By placing the optional two elements in a united condition, all of the three elements become united. Hence the engine output shaft and the auxiliary machine drive shaft attain a directly connected condition, so that the torque of the engine is transmitted unchanged to the auxiliary machine drive shaft. Furthermore, the motor output shaft also is rotated with the rotation of the engine due to uniting the three elements of the planetary mechanism. Consequently, it is possible to use the motor as an electric motor, and supplement the output of the engine, or to use this as a generator to charge the battery.

A second aspect of the invention proposes for the engine system of the first aspect, an engine system wherein the rotation direction restriction device is a one-way clutch.

According to this aspect of the invention, the rotation direction of the auxiliary machine drive shaft can be restricted to one direction by means of the one-way clutch without performing any special control.

A third aspect of the invention proposes for the above engine system, an engine system comprising a rotation direction restriction device, which restricts a rotation direction of the engine output shaft to one direction.

According to this aspect of the invention, the rotation direction of the engine output shaft is restricted to one direction by the operation of the rotation direction restriction device. Consequently, in the case of driving the auxiliary machine in an engine stopped condition, then even in the case where the starting torque of the engine is not set sufficiently large with respect to the drive torque of the auxiliary machine, reverse rotation of the engine can be stopped, and drive of the auxiliary machine can be reliably performed.

A fourth aspect of the invention proposes for the above engine system, an engine system wherein the rotation direction restriction device is a one-way clutch.

According to this aspect of the invention, similarly to the second aspect of the invention, the rotation direction of the engine output shaft can be restricted to one direction by means of the one-way clutch without performing any special control.

A fifth aspect of the invention proposes for the above engine system, an engine system wherein the auxiliary machine is a compressor for an air conditioner.

According to this aspect of the invention, even in the engine stop condition, the compressor of the air conditioner, being one of the auxiliary machines, can be driven by the motor. Therefore, even in the engine stop condition as in the hybrid vehicle or the idle stop vehicle, the comfortableness in the interior of the vehicle can be maintained.

Moreover, since the reverse rotation of the compressor of the air conditioner can be stopped by the operation of the rotation direction restriction device, the integrity of the compressor can be maintained.

A sixth aspect of the invention proposes for the above engine system, an engine system wherein the engine output shaft is connected to the carrier, the motor output shaft is connected to the sun gear, and the auxiliary machine drive shaft is connected to the ring gear.

According to this aspect of the invention, by uniting by operation of the connection device the carrier connected to the engine output shaft, and the ring gear connected to the auxiliary machine drive shaft, the engine output shaft and the auxiliary machine drive shaft can be directly connected, and the auxiliary machine can be driven by the engine.

Furthermore, by releasing the connection condition by the connection device between the carrier and the ring gear, the planetary mechanism attains a differential condition, so that the generated torque of the motor can be respectively transmitted from the sun gear to the carrier and the ring gear. At this time, by the operation of the rotation direction restriction device, rotation of the ring gear is restricted, so that only the engine connected to the carrier can be started by the torque of the motor. Furthermore, since the carrier is reduced in speed with respect to the sun gear, the torque transmitted to the engine output shaft can be made a larger torque than the motor generation torque.

A seventh aspect of the invention proposes for the above engine system, an engine system wherein a pinion gear which is engaged with the sun gear and the ring gear is provided on the carrier, and the pinion gear and the sun gear are formed with substantially the same radius.

According to this aspect of the invention, by making the pinion gear provided on the carrier substantially the same diameter as the sun gear, a speed reduction ratio for the carrier with respect to the sun gear can be set to a ratio of approximately 4 times. As a result, the engine can be started by a motor which generates a torque of approximately ¼ of the torque required for starting the engine, enabling the motor to be miniaturized. Moreover, by making the pinion gear approximately the same diameter as the sun gear, an increase in rotation speed of the pinion gear can be kept down.

Here the pinion gear and the sun gear being approximately the same diameter, includes the case where the pinion gear and the sun gear are exactly the same diameter, and also the case where these have a difference to the extent that they appear substantially the same. For example, there is also the case such as where, if the diameter of the ring gear is limited, the diameter dimension for a suitable same diameter cannot be achieved from the relationship between the gear module and the radius.

An eighth aspect of the invention proposes an engine system wherein there is further provided an auxiliary machine connection device (clutch 39 in the embodiment of the invention) capable of connecting and disconnecting the auxiliary machine (compressor 4 in the embodiment of the invention), and the planetary mechanism (ring gear 8 of planetary mechanism 5 in the embodiment of the invention), and in an engine operating condition, in the case where a uniting connection device capable of uniting two or more elements of the planetary mechanism cannot be connected, the auxiliary machine and the planetary mechanism are connected by the auxiliary machine connection device to drive control the auxiliary machine.

According to this aspect of the invention, even in the case where the uniting connection device cannot be connected, by connecting the auxiliary machine to the planetary mechanism by means of the auxiliary machine connection device, and drive controlling the auxiliary machine, the engine torque can be transmitted to the motor by the reaction of the loading torque of the auxiliary machine, to generate electricity. As a result, even in the case where the uniting connection device cannot be connected, the motor is driven by the generator, so that the battery can be charged.

A ninth aspect of the invention proposes an engine system wherein the uniting connection device is electrically operated, and is separated while it is in an energized condition, and connected while it is in other conditions.

According to this aspect of the invention, even in the case where the connection device cannot be energized, since the connection device maintains the connected condition, electricity can be generated in the motor due to transmission of the engine torque to the motor. Furthermore, if the connection device is energized only for a non-connected condition, then in the case of the connected condition during normal vehicle travelling, it is not necessary to supply power to the connection device, and hence power consumption can be significantly reduced.

A tenth aspect of the invention proposes an engine system operating method for an engine system comprising a planetary mechanism with any one of an engine output shaft, a motor output shaft and an auxiliary machine drive shaft respectively connected to three elements comprising a sun gear, a carrier and a ring gear, wherein the operating method comprises the steps of, starting the engine by rotating the output shaft of the motor in one direction while maintaining said auxiliary machine output shaft at a stationary state, driving the auxiliary machine by the motor by rotating said motor output shaft in an opposite direction while maintaining said engine output shaft at a stationary state, and driving the auxiliary machine by the engine by uniting two or more elements of said planetary mechanism.

According to this aspect of the invention, the drive of the auxiliary machine and starting of the engine in a condition where the engine is stopped can be performed by a single motor, by changing the rotation direction of the motor, uniting the elements of the planetary mechanism, and restricting the rotation of the auxiliary machine drive shaft or the engine output shaft. Moreover, the auxiliary machine can be driven by the engine.

An eleventh aspect of the invention proposes a starting apparatus for an engine comprising, a planetary mechanism having three elements comprising a sun gear, a carrier and a ring gear, and with an engine output shaft and an auxiliary machine drive shaft respectively connected to two optional elements of these, a motor connected to the remaining one element of the planetary mechanism, a uniting connection device capable of uniting two or more elements of the planetary mechanism; and a rotation direction restriction device capable of restricting a rotation direction of elements connected to the auxiliary machine drive shaft to one direction.

According to this aspect of the invention, by making the connection of the two elements of the planetary mechanism by the connection device a released condition, the motor torque can be respectively transmitted to the engine output shaft and the auxiliary machine drive shaft. At this time, due to the operation of the rotation restriction device, rotation of elements connected to the auxiliary machine drive shaft is restricted, and hence the motor torque is only transmitted to the engine output shaft, so that the engine can be started.

BRIEF DESCRIPTION OF THE DRAWINGS

FIG. 20 is an condition explanatory diagram for a clutch or a one-way clutch for each of the operating conditions, in a vehicle installed with the engine system of FIG. 17.

FIG. 23 is a flow chart showing a control flow for during travelling of a vehicle installed with the engine system provided with the clutch of FIG. 21.

FIG. 24 is a condition explanatory diagram for a clutch or one-way clutch for each of the operating conditions, in a vehicle installed with the engine system provided with the clutch of FIG. 21.

DETAILED DESCRIPTION OF THE INVENTION

Hereunder is a description of an engine system 1 according to a first embodiment of the present invention with reference to the drawings.

Figure 1:
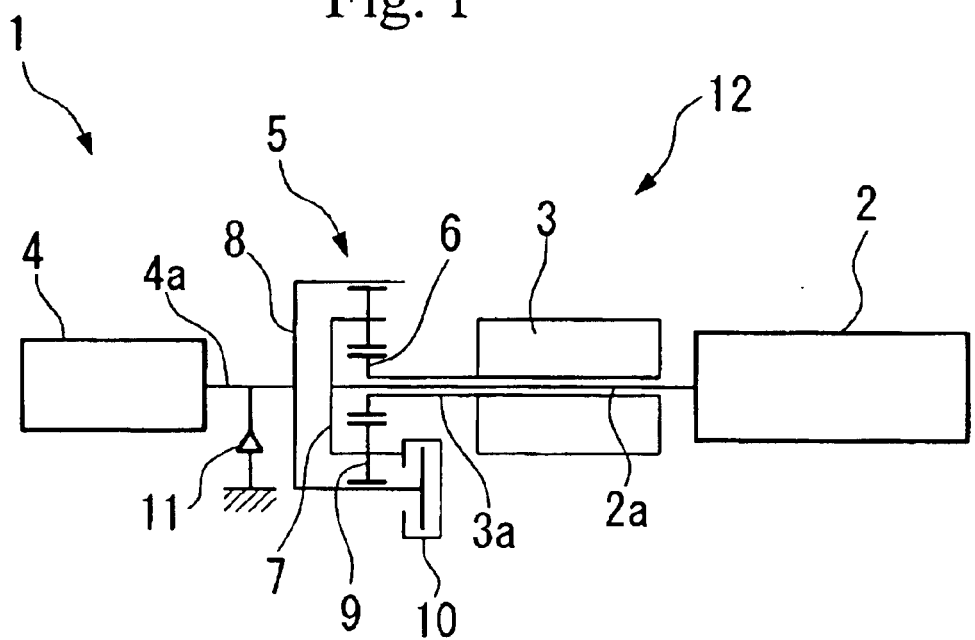
FIG. 1 is a schematic diagram showing the construction of an engine system according to an embodiment of the present invention.

The engine system 1 according to this embodiment, as shown in FIG. 1 comprises an engine 2, a motor 3, auxiliary machine, for example a compressor 4 of an air conditioner, and a planetary mechanism 5 which connects the engine 2, the motor 3 and the compressor 4.

Figure 2:
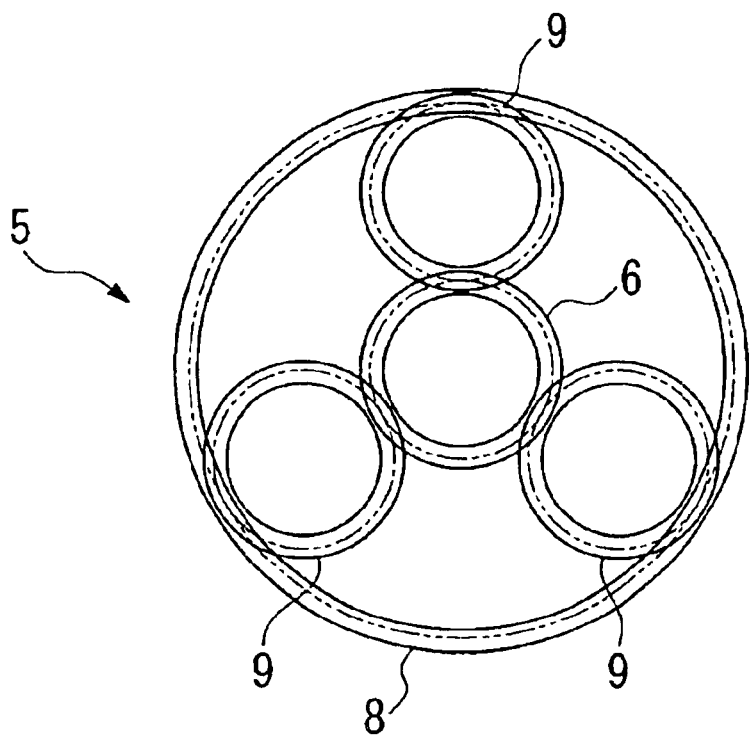
FIG. 2 is a schematic diagram showing a positional relationship of three elements of a planetary mechanism provided in the engine system of FIG. 1.

The planetary mechanism 5 comprises a sun gear 6, a carrier 7 and a ring gear 8. As shown in FIG. 2, three pinion gears 9 are arranged between the sun gear 6 and the ring gear 8, and mesh with both. These three pinion gears 9 are linked by the carrier 7. The diameter ratio of the sun gear 6, the pinion gears 9 and the ring gear 8 is set so as to give ratios of approximately 1:1:3. That is to say, the sun gear 6 and the pinion gears 9 are selected so as to have approximately the same diameter.

Between the carrier 7 and the ring gear 8 is fitted a clutch 10 (connection device) which can selectively unite and release the two elements. If the clutch 10 is engaged so that the carrier 7 and the ring gear 8 are united, the carrier 7 and the ring gear 8 rotate together as one, and do not move relatively. Furthermore, if the clutch 10 is disconnected so that the carrier 7 and the ring gear 8 are released, the planetary mechanism 5 becomes a differential condition, so that the carrier 7 and the ring gear 8 are rotated relatively.

The motor 3 as shown in FIG. 1, has a hollow output shaft 3a, and the output shaft 3a is connected to the sun gear 6.

An output shaft 2a of the engine 2 is passed through the hollow output shaft 3a of the motor 3 and connected to the carrier 7.

A drive shaft 4a of the compressor 4 is connected to the ring gear 8.

For auxiliary machine such as the compressor 4, the rotation direction thereof is prescribed and hence it is necessary to prevent reverse rotation. Therefore, a one-way clutch 11 (rotation direction restriction device) which allows only rotation in the normal direction, and restricts rotation in the reverse direction, is fitted to the ring gear 8 connected to the drive shaft 4a of the compressor 4.

Furthermore, in the engine system 1 of the above construction, there is provided an engine starting apparatus 12 comprising: the planetary mechanism 5 in which the output shaft 2a of the engine 2 is connected to the carrier 7, and the drive shaft 4a of the compressor 4 is connected to the ring gear 8; the motor 3 connected to the ring gear 6; the clutch 10 capable of uniting the carrier 7 and the ring gear 8; and the one-way clutch 11 capable of restricting the rotation direction of the ring gear 8 to one direction.

Operation of the engine system 1 and the engine starting apparatus 12 according to the present embodiment constructed in this way is described hereunder.

(During Engine Start)

When the engine 2 is started by the motor 3, the clutch 10 is released to give a condition where relative rotation between the carrier 7 and the ring gear 8 is allowed. As a result, since the planetary mechanism 5 is in the differential condition, the torque of the motor 3 is transmitted from the sun gear 6 via the pinion gears 9 and the carrier 7 to the output shaft 2a of the engine 2, and from the pinion gears 9 via the ring gear 8 to the drive shaft 4a of the compressor 4.

That is to say, due to the friction existing in the engine 2 connected to the carrier 7, a torque acts on the carrier 7 to restrain rotation thereof. Therefore the torque of the motor 3 transmitted from the sun gear 6 to the pinion gears 9 acts so as to rotate the ring gear 8 which is meshed with the pinion gears 9.

In this case, when the motor 3 is rotated in the normal direction, the torque acts so as to rotate the carrier 7 in the normal direction, and the ring gear 8 in the reverse direction. Since the ring gear 8 is provided with the one-way clutch 11 which prevents reverse rotation of the ring gear 8, rotation of the ring gear 8 in the reverse direction is restricted, so that this is locked in the stationary condition.

Consequently, the torque of the motor 3 only acts so as to rotate the carrier 7 in the normal direction.

Figure 3:
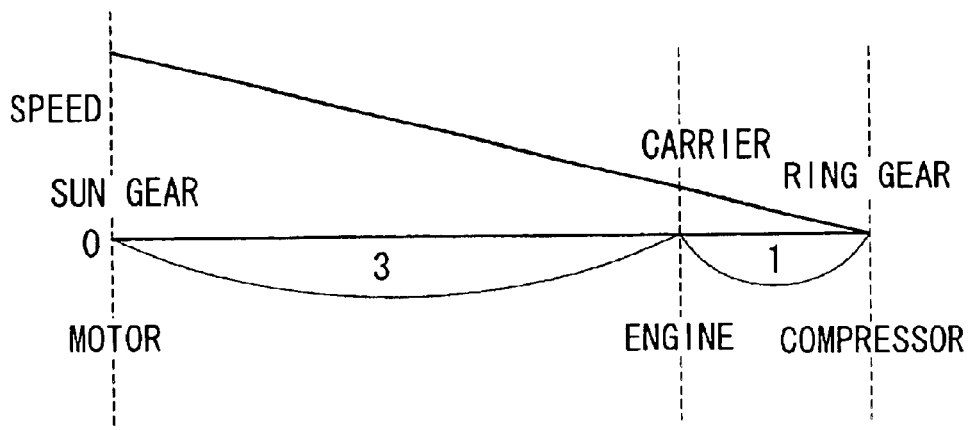
FIG. 3 is velocity diagram showing the speed of the three elements of the planetary mechanism of the engine system of FIG. 1, at the time of starting the engine.

FIG. 3 is a velocity diagram for the planetary mechanism 5 at this time. According to this, with the ring gear 8 stopped, the number of revolutions of the engine 2 is reduced to approximately ¼ of the number of revolutions of the motor 3. That is to say, the torque acting on the output shaft 2a of the engine 2 is approximately 4 times the generated torque of the motor 3. Consequently, it is sufficient if the motor 3 can generate a torque of approximately of ¼ of the torque necessary for starting the engine 2, and hence miniaturization of the motor 3 is possible. Conversely, if a motor 3 which generates a greater torque than this is adopted, then a sufficiently large starting torque can be made to act on the output shaft 2a of the engine 2, so that the engine is started quickly.

(Engine Stop and Auxiliary Drive)

While the engine 2 is stopped, in the case of driving the compressor 4 by the motor 3, then similar to the above, the clutch 10 is released, and the planetary mechanism 5 becomes a differential condition. Then, opposite to the above, the motor 3 is rotated in the reverse direction. As a result, a torque operates on the carrier 7 in the opposite direction so as to rotate the ring gear 8 in the normal direction.

In the case where the friction of the engine 2 is sufficiently large, the carrier 7 connected to the output shaft 2a of the engine 2 is maintained in the stationery condition. On the other hand, the one-way clutch 11 provided on the ring gear 8 does not restrict rotation of the ring gear 8 in the normal direction, and hence only the ring gear 8 is rotated in the normal direction.

Figure 4:
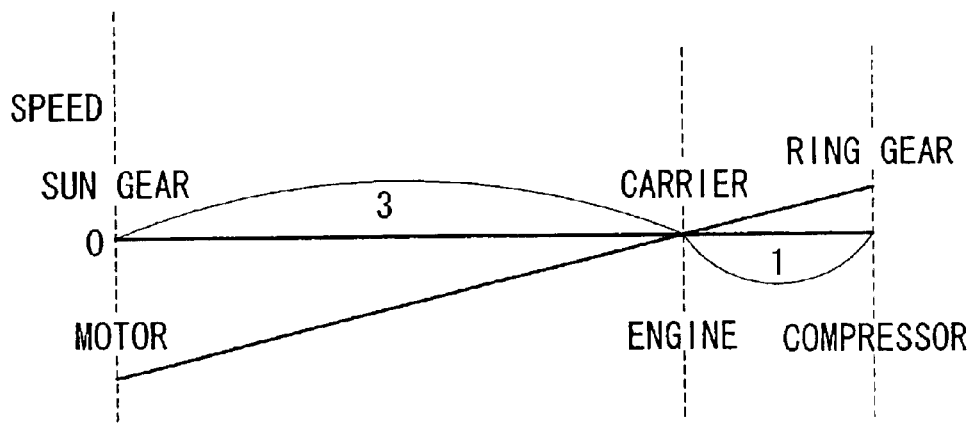
FIG. 4 is a velocity diagram showing the speed of the three elements of the planetary mechanism of the engine system of FIG. 1, at the time of engine stop and auxiliary machine drive.

FIG. 4 is a velocity diagram of the planetary mechanism 5 at this time. According to this, the output shaft 2a of the engine 2 is stopped, and the number of revolutions of the drive shaft 4a of the compressor 4 is reduced to approximately ⅓ of the number of revolutions of the motor 3. That is to say, the torque acting on the drive shaft 4a of the compressor 4 is approximately three times the generated torque of the motor 3. Consequently, it is sufficient if the motor 3 can generate a torque of approximately ⅓ of the necessary torque to drive the compressor 4, and hence the motor 3 can be miniaturized.

(Auxiliary Drive by Engine)

To drive the compressor 4 during operation of the engine 2, then opposite to the above, the clutch 10 is operated, and the carrier 7 and the ring gear 8 are united. As a result, the relative rotation of the carrier 7 and the ring gear 8 is restricted, and hence the pinion gears 9 fitted to the carrier 8 are also held in a meshed condition at fixed locations of the ring gear 8. Moreover, since the pinion gears 9 do not turn on the ring gear 8, the meshing of the pinion gears 9 and the sun gear 6 is also held at fixed locations, so that the relative rotation is restricted.

Figure 5:
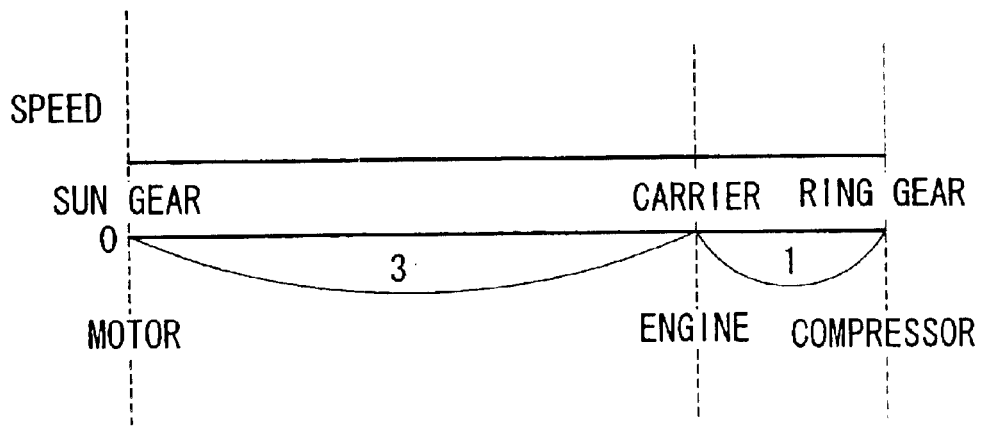
FIG. 5 is a velocity diagram showing the speed of the three elements of the planetary mechanism of the engine system of FIG. 1, at the time of auxiliary machine drive by the engine.

That is to say, the sun gear 6, the carrier 7 and the ring gear 8 are all fixed as one, and hence the output shaft 2a of the engine 2, the output shaft 3a of the motor 3 and the drive shaft 4a of the compressor 4 are directly coupled. Consequently, the generated torque of the engine 2 becomes the drive torque for the compressor 4 without change. FIG. 5 is a velocity diagram of the planetary mechanism 5 at this time. This shows the engine 2, the motor 3 and the compressor 4 are all rotating at the same speed.

Here, when the output shaft 2a of the engine 2 rotates normally, the drive shaft 4a of the compressor 4 and the output shaft 3a of the motor 3 also rotate normally at the same time. The rotation in the normal direction of the drive shaft 4a of the compressor 4 is not restricted by the one-way clutch 11, and hence the compressor 4 is driven by the engine 2.

Moreover, by operating the motor 3 as a generator, electric power generation is performed with the torque transmitted to the output shaft 3a of the motor 3 as the input, and a battery (omitted from the figure) can be charged by the obtained electric power.

Furthermore, by operating the motor 3 as an electric motor, then it is also possible to drive the compressor 4 and the like using the engine 2 and the motor 3 together.

Figure 6:
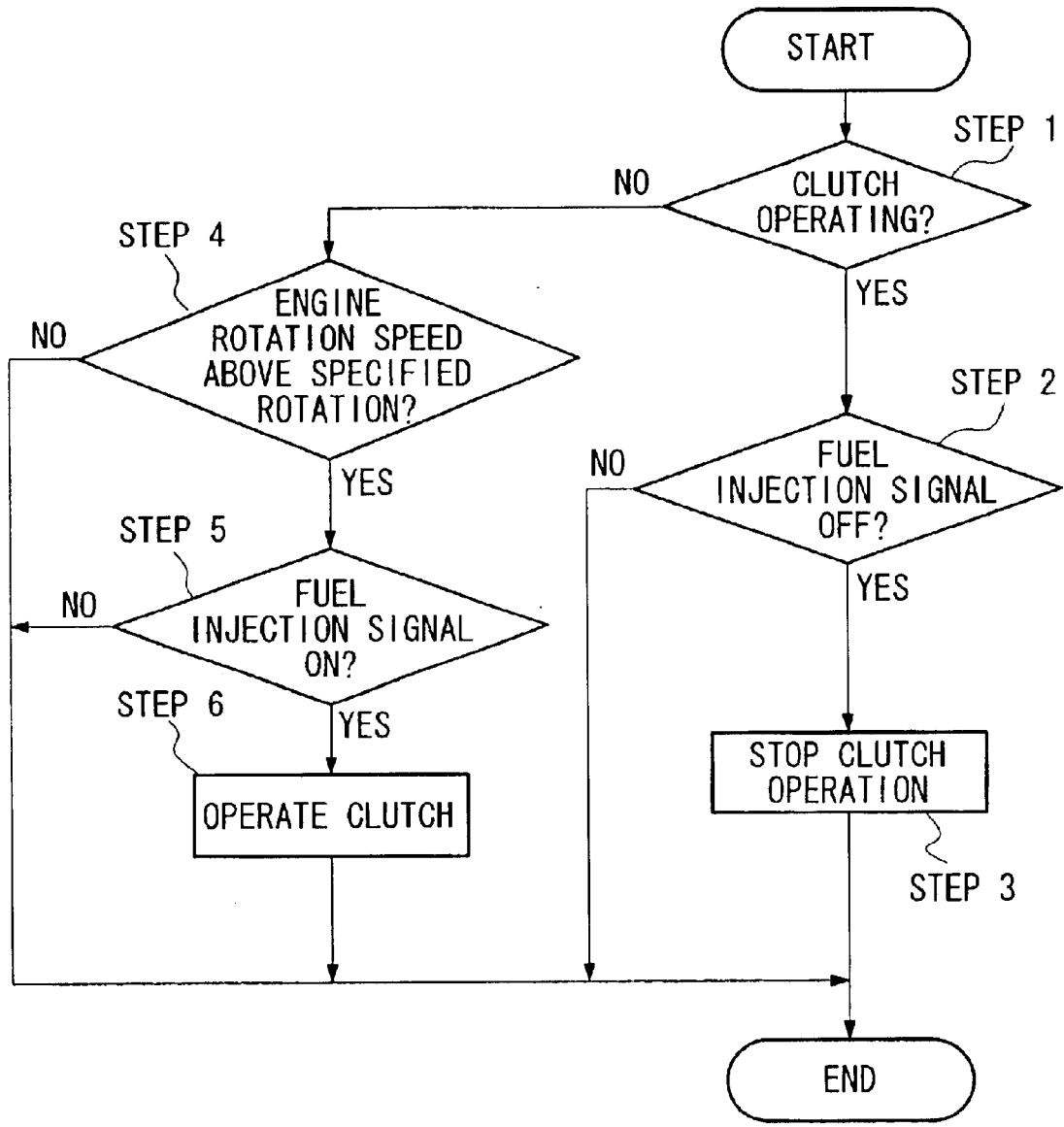
FIG. 6 is a flow chart showing a control flow of the engine system for during travelling of a vehicle installed with the engine system of FIG. 1.

FIG. 6 shows an example of a control flow for the engine system 1 according to the embodiment, for during vehicle travelling.

The number of revolutions of the engine 2 is detected by a rotation sensor (not shown in the figure). Furthermore, a fuel injection signal or the like inside an ECU (engine control unit) (not shown in the figure) is detected, and control is performed based on these.

At first, in step 1, it is determined whether the clutch 10 is operating or not. The clutch 10 operating is the case where the output shaft 2a of the engine 2 is connected directly to the drive shaft 4a of the compressor 4 of the air conditioner, and hence the vehicle is travelling or is idling with the engine 2 as the drive source. In step 2 it is determined whether the fuel injection signal is off or not.

In the case where the fuel injection signal is off, the engine 2 is in the non operating condition. Then, in the case where the engine 2 is in the non operating condition, in step 3 the operation of the clutch 10 is stopped, and the connection condition of the carrier 7 and the ring gear 8 is released. After this, starting of the engine 2 or drive of the compressor 4 by the motor 3 is possible.

Moreover, in step 2, in the case where the fuel injection signal is detected, travelling by means of the engine 2 continues.

Next, in step 1, in the case where it is determined that the clutch 10 is not operating, since this is the start condition for the engine 2, or the drive condition for the auxiliary machine such as the compressor 4 by means of the motor 3, then in step 4, based on a signal from the rotation sensor, it is determined whether the rotation speed of the engine 2 is equal to or above a prescribed rotation speed or not. In the case where this is equal to or below the prescribed rotation speed, this is a condition where the engine 2 is stopped, or the engine 2 cannot be used as a drive source, and the start operation of the engine 2 or the drive operation of the auxiliary machine such as the compressor 4 by means of the motor 3 is continued.

In step 4, in the case where it is determined that the engine 2 is equal to or above the prescribed rotation speed, then in step 5, it is determined whether the fuel injection signal is an on condition or not. In the case where this is an off condition, then the current condition continues, while in the case where this is an on condition, the engine 2 becomes an operating condition. Then, in the case where the engine 2 is in the operating condition, in order to perform for example drive of the compressor 4 by means of the engine 2, in step 6, the clutch 10 is operated, so that the engine 2, the compressor 4 and the motor 3 are directly connected, and drive is performed by the engine 2.

According to the engine system 1 of the embodiment constructed in this manner, operation modes such as starting of the engine 2, drive of the compressor 4 while the engine 2 is stopped, and drive of the compressor 4 by the engine 2 can be changed by the single clutch 10 and by merely controlling the rotation direction of the single motor 3. Consequently, the equipment construction can be simplified, and complicated control becomes unnecessary.

Furthermore, starting of the engine 2 and drive of the compressor 4 can be performed by a single motor 3. Therefore the number of parts can be reduced and a reduction in cost realized.

Moreover, by placing the planetary mechanism 5 in the differential condition, the torque from the motor can be amplified and transmitted from the engine 2 to the compressor 4. Consequently, the motor 3 can be miniaturized and a further reduction in cost achieved.

Furthermore, even while the engine 2 is stopped, drive of the auxiliary machine, beginning with the compressor 4, can be performed by the motor 3. Therefore, even in an engine stopped condition during driving, which occurs in a hybrid vehicle or an idle stop vehicle, the air-conditioning can be operated, and the comfort of the vehicle interior can be maintained.

Moreover, by simultaneously operating the motor 3 as a generator while travelling by the engine 2, electric power can be regenerated and battery charging performed.

Furthermore, by simultaneously operating the motor 3 as a generator while travelling by the engine 2, the engine generated torque can be supplemented, enabling an improvement in fuel consumption.

The present invention also includes the following various aspects, other than the aspects illustrated in the abovementioned embodiments.

Figure 7:
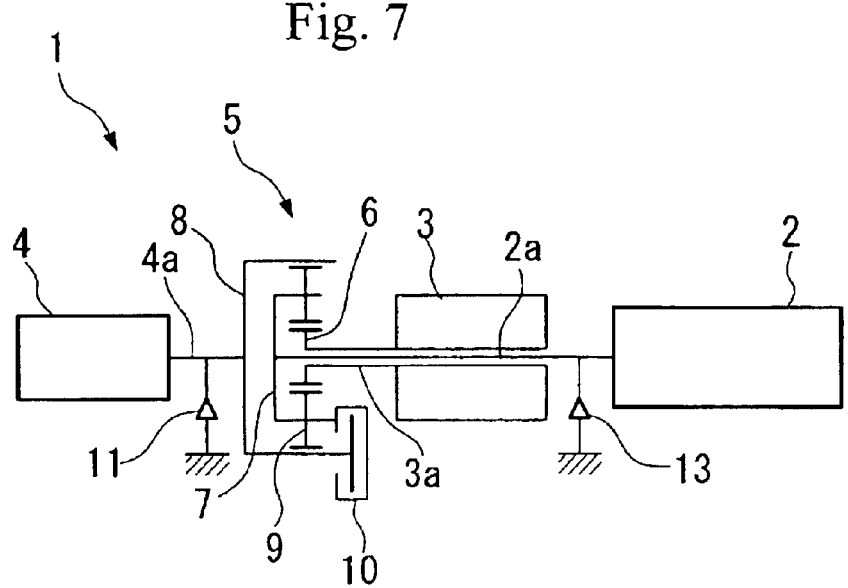
FIG. 7 is a schematic diagram showing an engine system according to another embodiment of the present invention.

A first aspect is that, as shown in FIG. 7, a one-way clutch 13 may be provided on the output shaft 2a of the engine 2. By having such a construction, at the time of driving the compressor 4 by the motor 3, the rotation of the carrier 7 connected to the output shaft 2a of the engine 2 can be stopped without depending on the magnitude of the friction of the engine 2. Consequently, the compressor 4 can be reliably driven irrespective of the size of the friction of the engine 2.

Figure 8:
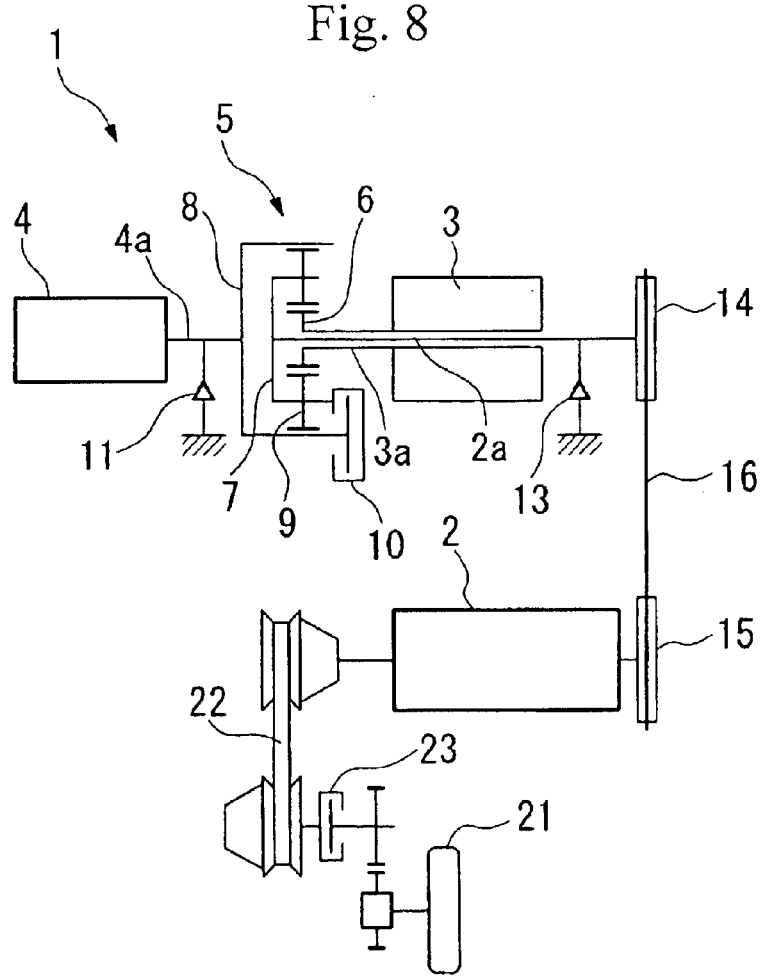
FIG. 8 is a schematic diagram showing a case where a belt is used to connect between a motor and an engine, in the engine system according to another embodiment of the present invention.

A second aspect is that, in the abovementioned embodiment, the case is shown where the engine 2, the motor 3 and the compressor 4 are distributed on the same axis. However, as shown in FIG. 8, the output shaft 2a of the engine 2 may be connected to the sun gear 6 of the planetary mechanism 5 via a pair of pulleys 14 and 15 and a belt 16 which is spanned between these pulleys 14 and 15. As a result, the length in the direction along the output shaft 2a of the engine 2 can be reduced. Consequently, installation inside an engine room where space is limited is possible.

Reference symbol 21 in the figure denotes a wheel (only one shown), reference symbol 22 denotes a variable speed device, and reference symbol 23 denotes a clutch which disconnects the engine 2 from the wheel 21, for example at the time of starting of the engine 2.

Figure 9:
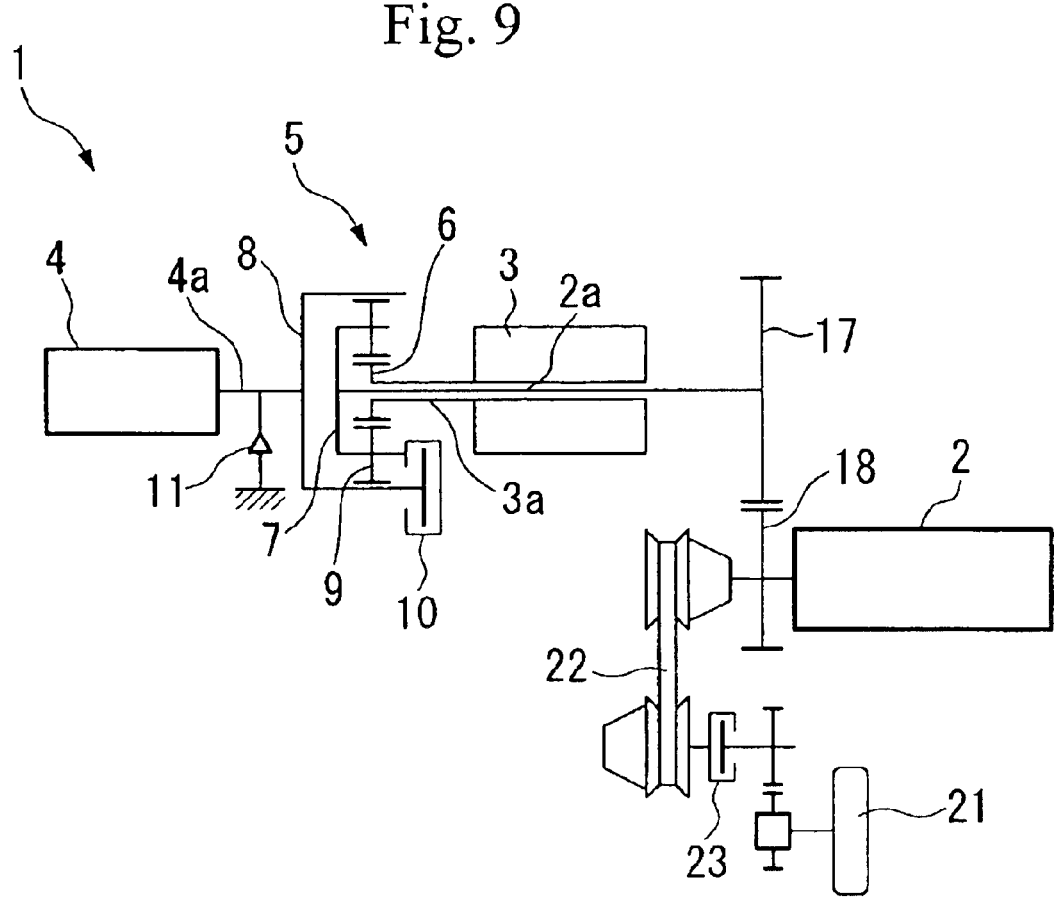
FIG. 9 is a schematic diagram showing a case where gears are used to connect between a motor and an engine, in the engine system according to another embodiment of the present invention.

As shown in FIG. 9, instead of the pulleys 14 and 15, and the belt 16 of FIG. 8, the same affect can be obtained if the output shaft 2a of the engine 2 is connected to the sun gear 6 via a pair of gears 17 and 18.

A third aspect is that, instead of the abovementioned construction, clutches 19 and 20 may be provided on the drive shaft 4a of the compressor 4 or the output shaft 2a of the engine 2.

Figure 10:
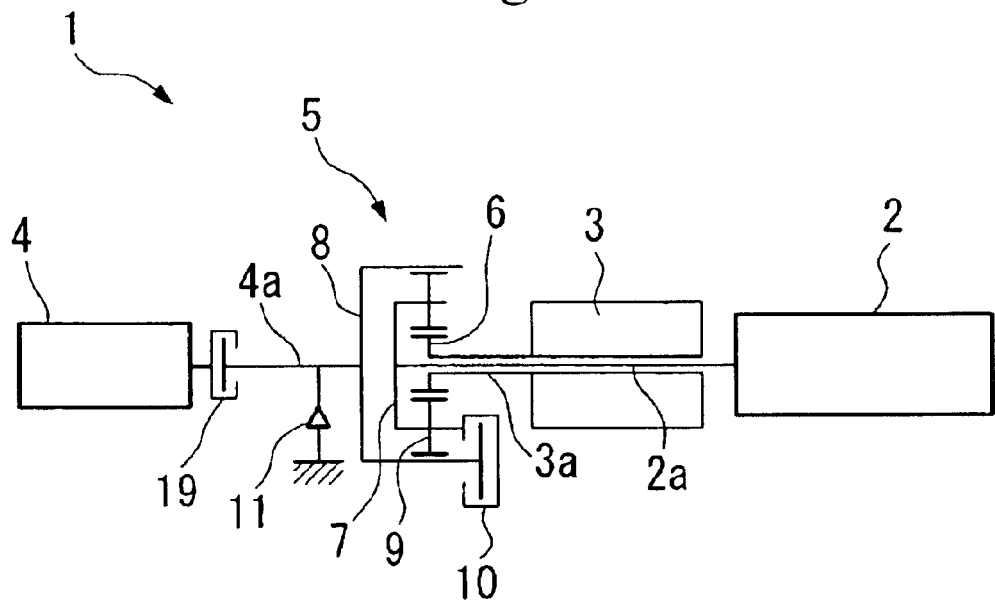
FIG. 10 is a schematic diagram showing the case where a clutch is provided on a drive shaft of a compressor, in the engine system according to another embodiment of the present invention.

That is to say, as shown in FIG. 10, if a clutch 19 is provided on the drive shaft 4a of the compressor 4, then drive or non drive of the compressor 4 can be selected by connecting or disconnecting the clutch 19.

Figure 11:
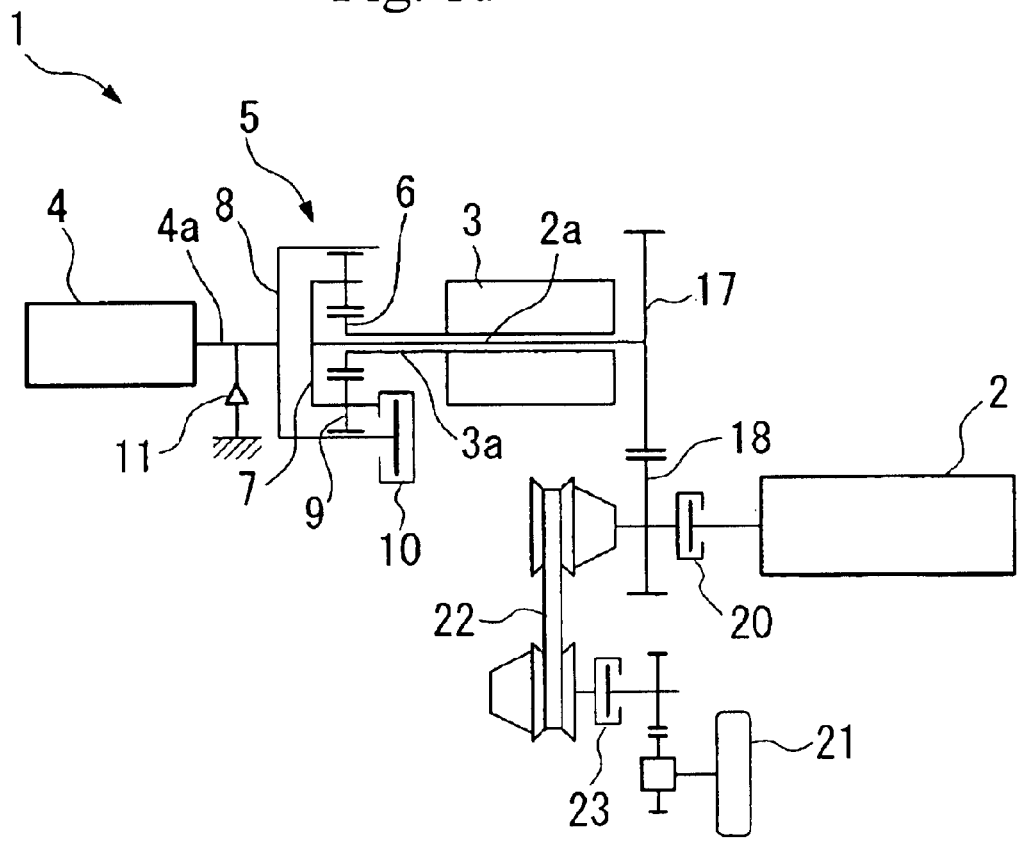
FIG. 11 is a schematic diagram showing a case where a clutch is provided on the output shaft of an engine, in the engine system according to another embodiment of the present invention.

Moreover, as shown in FIG. 11, by providing a clutch 20 on the output shaft 2a of the engine 2, travelling motion can be performed by only the motor 3 without driving the engine 2.

A fourth aspect is that, in the abovementioned embodiments, the description was for where the compressor 4 of the air conditioner was given as an example for the auxiliary machine. However instead of this, or together with this, other auxiliary machine, for example a power steering pump, an automatic transmission oil pump and a brake vacuum pump and the like may be driven.

Figure 12:
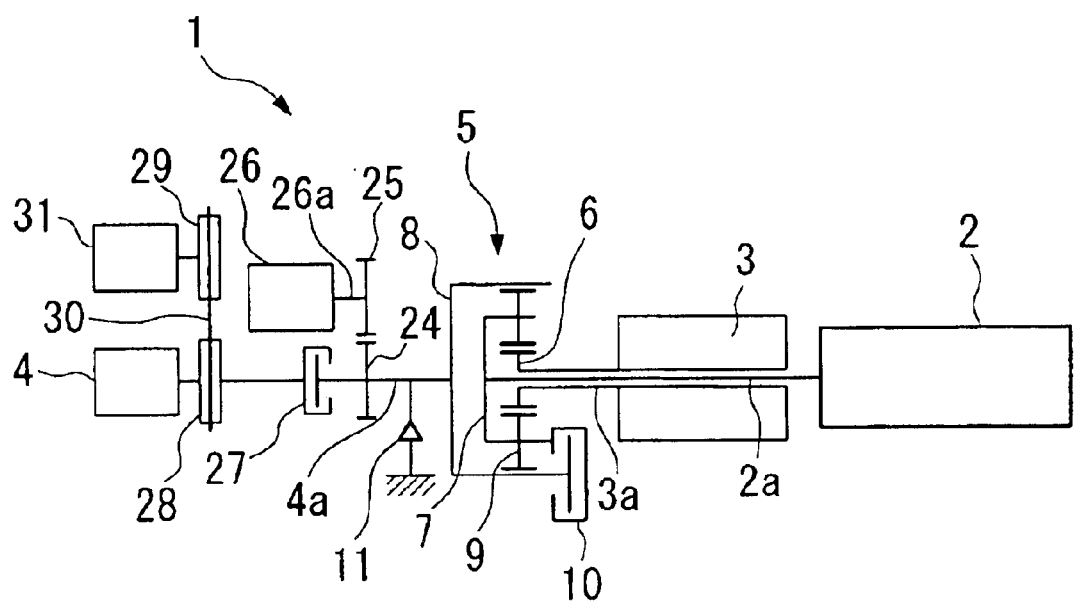
FIG. 12 is a schematic diagram showing a construction for a case of driving a plurality of auxiliary machine, in the engine system according to another embodiment of the present invention.

That is to say, as shown in FIG. 12, a drive shaft 26a of an oil pump 26 may be connected to the ring gear 8 via a pair of gears 24 and 25, a drive shaft 4a of an air conditioner 4 may be connected to the same ring gear 8 via a clutch 27, and also a vacuum pump 31 may be connected via pulleys 28 and 29 and a belt 30.

Figure 13:
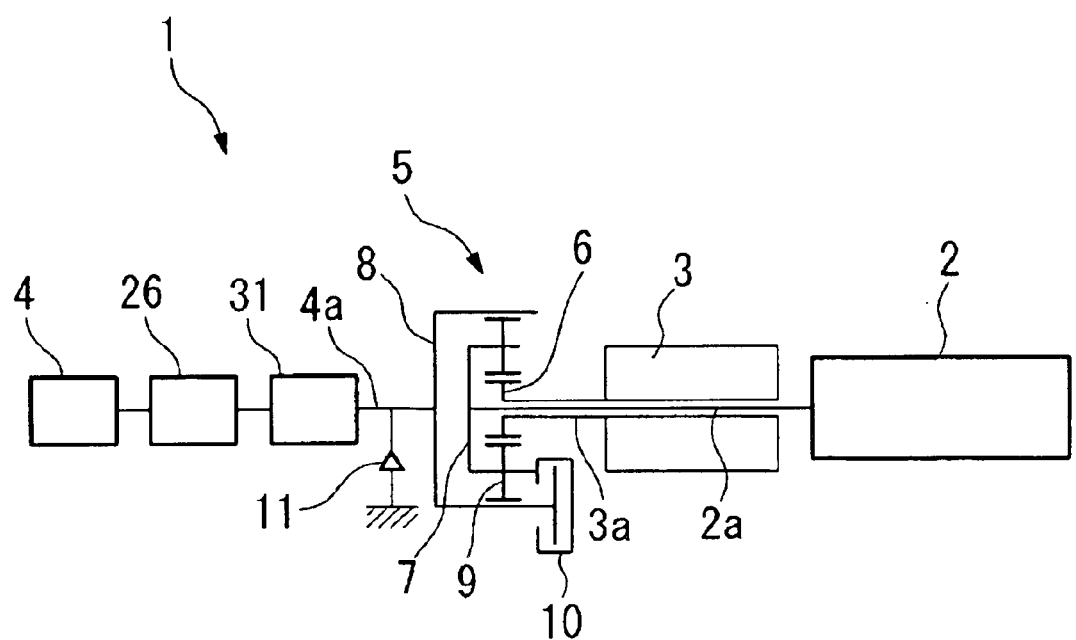
FIG. 13 is schematic diagram showing another configuration for a case of driving a plurality of auxiliary machine, in the engine system according to another embodiment of the present invention.

Moreover, as shown in FIG. 13, the oil pump 26, the vacuum pump 31 and the compressor 14 may be connected in series to the ring gear 8.

Figure 14:
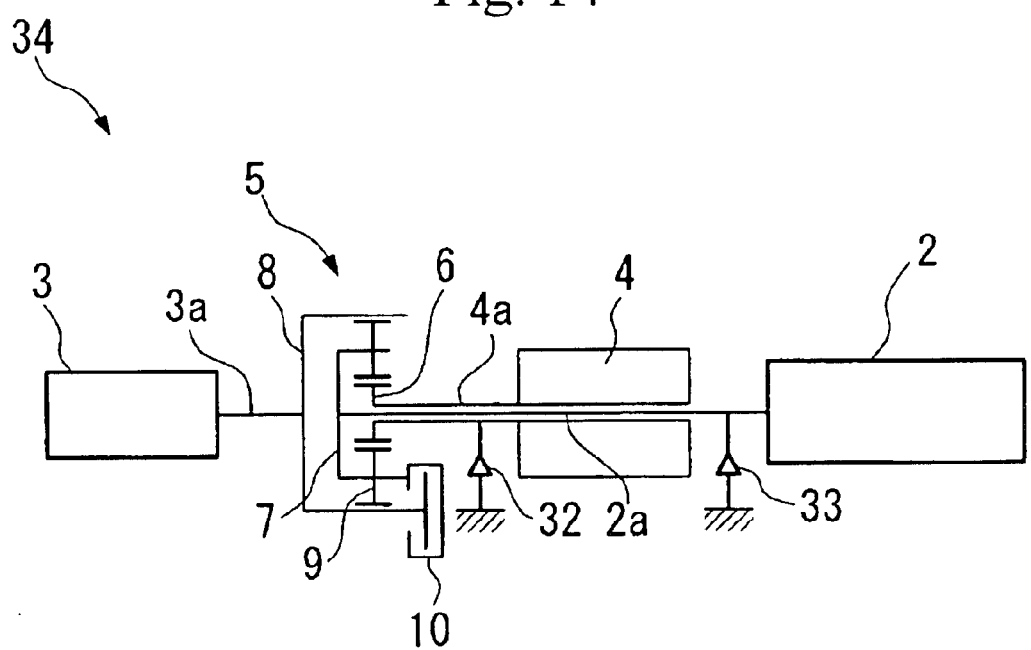
FIG. 14 is a schematic diagram showing a configuration of an engine system according to another embodiment of the present invention.

A fifth aspect is that, in the abovementioned embodiments, the output shaft 3a of the motor 3 is connected to the carrier 6 of the planetary mechanism 5, the output shaft 2a of the engine 2 is connected to the carrier 7, and the drive shaft 4a of the compressor 4 is connected to the ring gear 8. However instead of this, the construction may be as shown in FIG. 14. That is to say, in the example shown in FIG. 14, the drive shaft 4a of the compressor 4 is connected to the sun gear 6 of the planetary mechanism 5, and the output shaft 3a of the motor 3 is connected to the ring gear 8. Reference symbols 32 and 33 denote one-way clutches which prevent reverse rotation of the drive shaft 4a of the compressor 4 and the output shaft 2a of the engine 2.

With an engine system 34 of this construction, at the time of starting the engine 2 by the motor 3, the clutch 10 is released and the motor 3 is rotated normally. As a result, since the drive shaft 4a of the compressor 4 which tends to rotate in reverse is held in a stopped condition by the one-way clutch 32, the output shaft 2a of the engine 2 is rotated normally to start the engine 2. Moreover, at the time of driving the compressor 4 by the motor 3 while the engine 2 is stopped, the clutch 10 is released and the motor 3 is rotated in reverse. As a result, since the output shaft 2a of the engine 2 which tends to rotate in reverse is held in the stopped condition by the one-way clutch 33, the drive shaft 4a of the compressor 4 is rotated normally to drive the compressor 4.

Furthermore, at the time of driving the compressor 4 by the engine 2, the clutch 10 is engaged so that the carrier 7 and the ring gear 8 are united. As a result, the three elements of the sun gear 6, the carrier 7 and the ring gear 8 are united. Hence the rotation torque from the engine 2 which is applied to the sun gear 6 is transmitted via the carrier 7 which is united with the sun gear 6, to the drive shaft 4a of the compressor 4 which is connected to the carrier 7, to thereby drive the compressor 4 by means of the engine 2.

Moreover, at this time, the rotation torque from the engine 2 is transmitted via the ring gear 8 which is united with the carrier 7 to the output shaft 3a of the motor 3, so that it is possible to use the motor 3 as a generator, or to supplement the output of the engine 2 by the motor 3.

The present invention is not limited to the abovementioned construction, and other combinations for connecting one-to-one any of the output shaft 2a of the engine 2, the output shaft 3a of the motor 3, and the drive shaft 4a of the compressor 4 to any of the sun gear 6, the carrier 7 and the ring gear 8 of the planetary mechanism 5, are also possible.

A sixth aspect is that, in the abovementioned embodiments, in order to enable drive of the compressor 4 by the engine 2, the carrier 7 connected to the output shaft 2a of the engine 2, and the ring gear 8 connected to the drive shaft 4a of the compressor 4 are united by the connection device comprising the clutch 10. However instead of this, also if either one of the sun gear 6 and the carrier 7 or the sun gear 6 and the ring gear 8 are united, the result is that the three elements of the sun gear 6, the carrier 7 and the ring gear 8 are united. Therefore, the same affect can be obtained. Moreover, the sun gear 6 and the carrier 7 and the ring gear 8 may all be simultaneously united.

Figure 15:
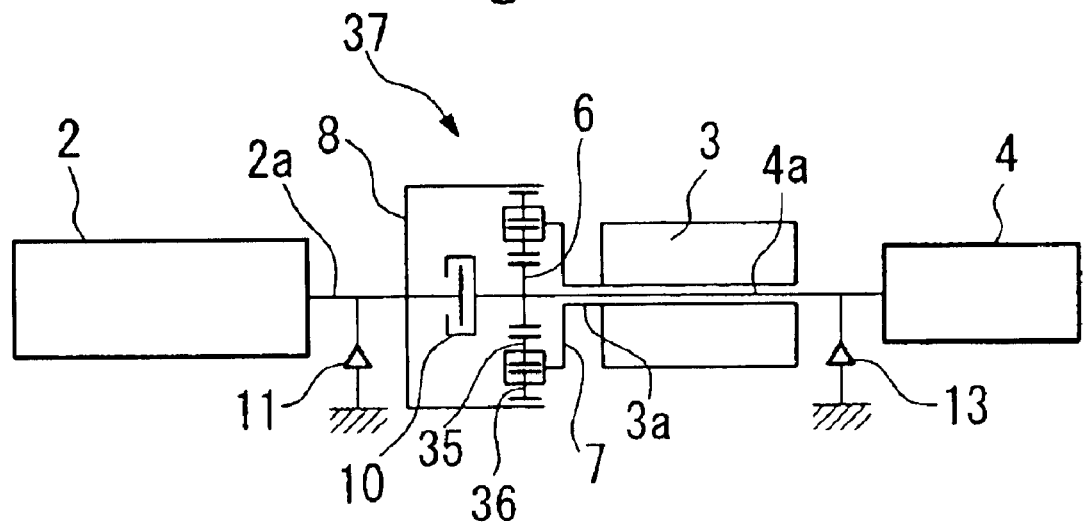
FIG. 15 is a schematic diagram showing a configuration of an engine system having a double planetary mechanism, in an engine system according to another embodiment of the present invention.
Figure 16:
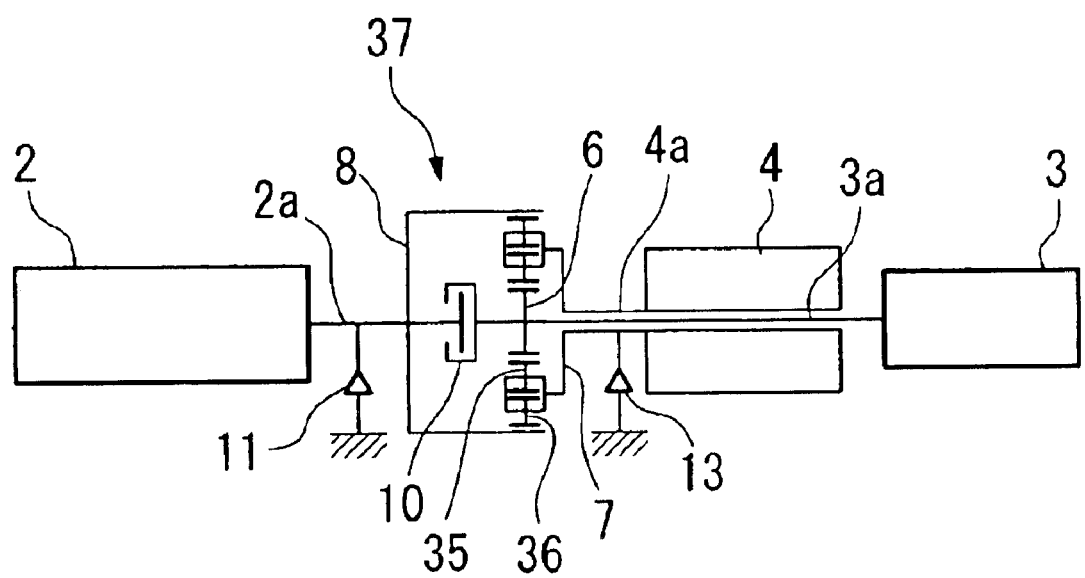
FIG. 16 is a schematic diagram showing another configuration of an engine system having a double planetary mechanism, in an engine system according to another embodiment of the present invention.

A seventh aspect is that, in the abovementioned embodiments, for the planetary mechanism 5, a single planetary mechanism is adopted where single row pinion gears 9 are held on the carrier 7. However instead of this, another optional planetary mechanism 37 may be adopted where double row or greater pinion gears 35 and 36 are held on the carrier 7. FIG. 15 and FIG. 16 show an apparatus configuration for the case where a double planetary mechanism is adopted. Similarly to the abovementioned embodiments explained for the single planetary mechanism, other combinations for connecting one-to one any of the output shaft 2a of the engine 2, the output shaft 3a of the motor 3, and the drive shaft 4a of the compressor 4 to any of the sun gear 6, the carrier 7 and the ring gear 8 of the planetary mechanism 38, are also possible.

An eighth aspect is that, in the abovementioned embodiments, as a rotation direction restriction device for stopping reverse rotation of the drive shaft 4a of the compressor 4 and the output shaft 2a of the engine 2, the one-way clutches 11, 13, 32 and 33 which have a simple construction not requiring control are adopted. However the invention is not limited to this, and a clutch and brake which can be switched by a control signal may be adopted.

Figure 17:
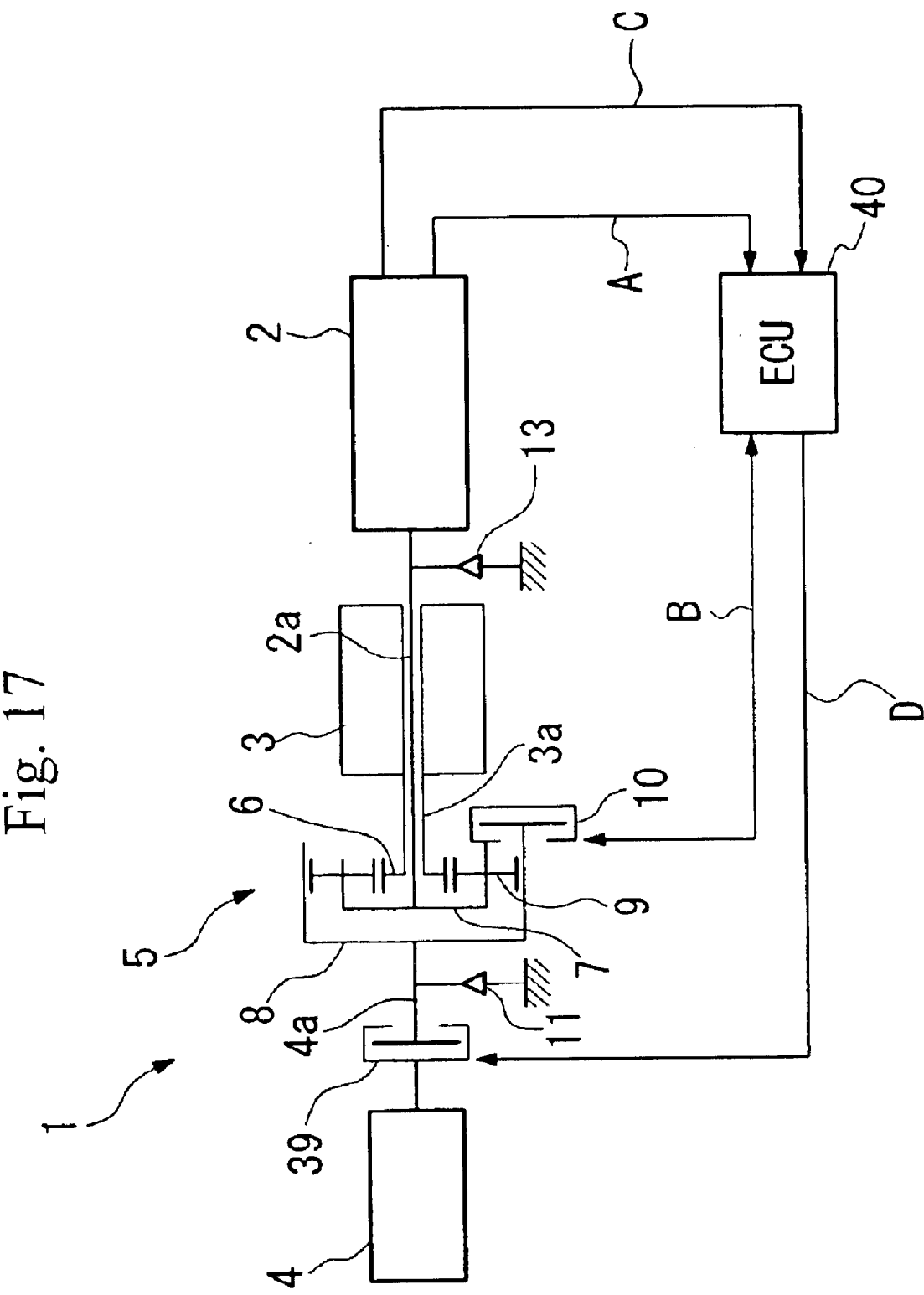
FIG. 17 is a schematic diagram showing a construction of an engine system according to another embodiment of the present invention.

A ninth aspect is that, in the abovementioned embodiments, the drive shaft 4a is configured so as to directly connect the compressor 4 to the ring gear 8 of the planetary mechanism 5. However as shown in FIG. 17, there may be provided a clutch 39 capable of connecting and disconnecting the compressor 4 and the ring gear 8 of the planetary mechanism 5 to the drive shaft 4a. In this case, the ECU (control unit) 40 is electrically connected to the engine 2, the (uniting) clutch 10 and the (compressor) clutch 39 to thereby execute an opening/closing operation of the clutch 10 and the clutch 39.

That is to say, a fuel injection signal (arrow A) or a revolution signal (arrow C) are transmitted from the engine 2 to the ECU 40, and by means of these signals the ECU 40 determines whether or not the operating condition is for where the engine 2 is generating its own torque. Then, in the case where it is determined in the ECU 40 that the operating condition is for the engine 2 generating its own torque, the ECU 40 generates a signal (arrow B) for placing the uniting clutch 10 in a connected condition. Moreover, in the case where it is determined that the engine 2 is not generating its own torque, the ECU 40 generates a signal (arrow B) for placing the uniting clutch 10 in a disconnected condition. Furthermore, the ECU 16 also generates a signal (arrow D) for the compressor clutch 39 for placing this in a connected condition or a disconnected condition.

Figure 18:
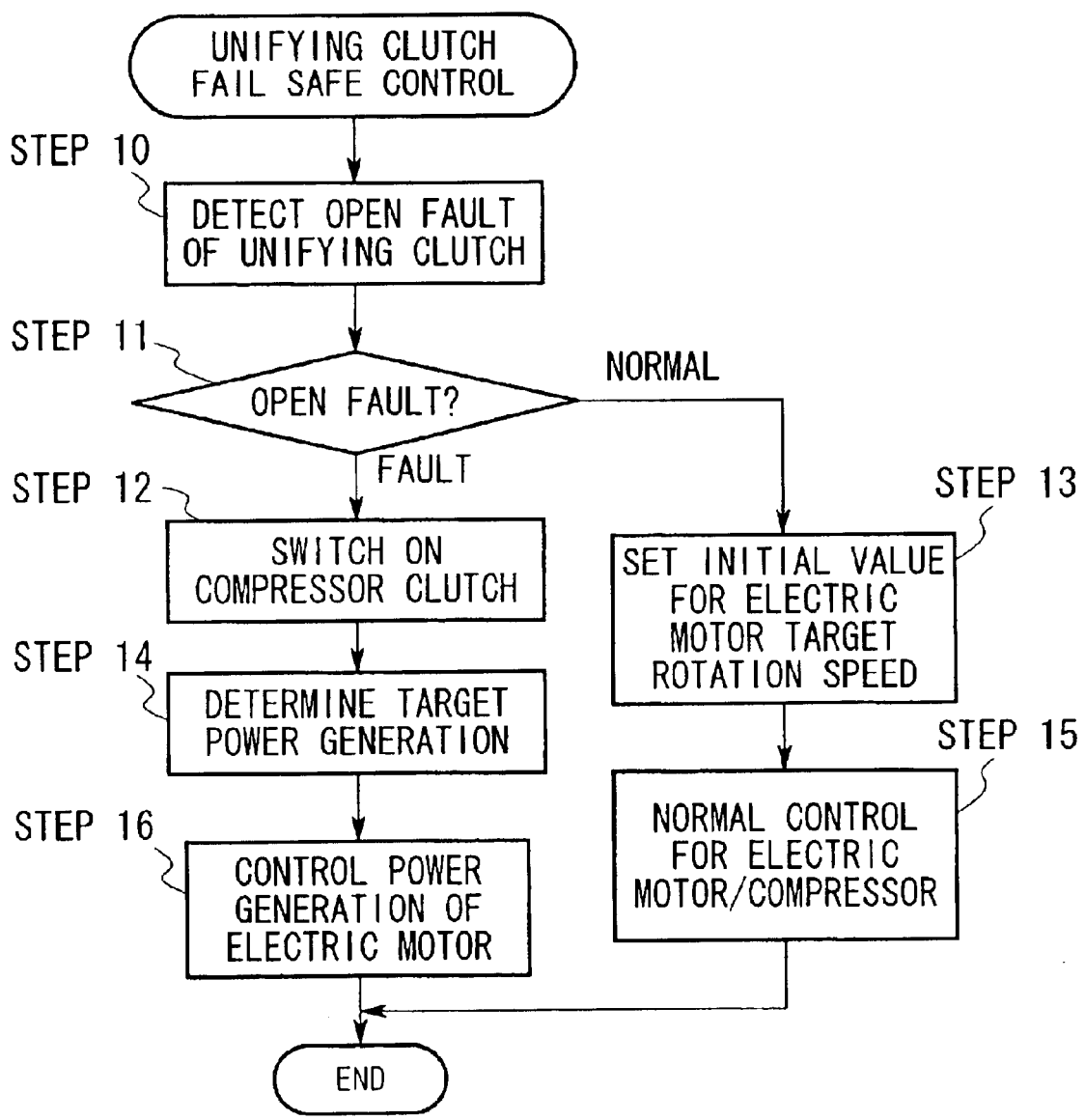
FIG. 18 is a flow chart showing a control flow for during travelling of a vehicle installed with the engine system of FIG. 17.

In this case, the situation of performing electric power generation control of the electric motor (motor) 3 is described using FIG. 18.

FIG. 18 is a flow chart showing a control flow (a failsafe control flow for the uniting clutch) during traveling of a vehicle installed with the engine system of FIG. 17. In the case where this failsafe control is performed, the engine 2 is in the idle stop condition.

At first, in step 10, detection is made for an open fault of the uniting clutch 10 (a fault where this is left open), and in step 11, it is determined whether there is an open fault or not.

In the case where the uniting clutch 10 is determined to be normal, then in step 13, an initial value for the target revolution speed of the electric motor (motor) 3 is set. This initial value is set to the engine rotation speed in preparation for a later mentioned time of detecting an open fault of the uniting clutch 10. Then, in step 15, normal control of the motor 3 and the compressor 4 is performed, and the series of processing ends.

In the case where it is determined that the uniting clutch 10 has an open fault, then in step 12, control for placing the compressor clutch 39 in the connected condition (ON) is performed. In this way, irrespective of whether or not drive of the compressor 4 is needed, by placing the compressor clutch 39 in the connected condition, the load torque of the compressor 4 can be transmitted to the electric motor 3, enabling electric power to be generated by the electric motor (motor) 3. As a result, even in the case where the uniting clutch 10 cannot be connected, the motor 3 can be operated as a generator enabling charging to be performed.

Then, in step 14, the target electric power generation is determined. This target electric power generation is set from the operating condition of the various electrical loads of the vehicle or from the charging condition of the battery, and is set to be larger the larger the electric power consumption of the electrical load, and to be larger the smaller the state of charge of the battery. Then, in step 16, control is performed so that the electric power generation approaches the target value, by controlling the rotational speed of the electric motor 3.

In the case where the uniting clutch 10 is a standard electromagnet clutch, this can be inspected by detecting for a disconnection in the coil of the electromagnetic clutch. If a disconnection is detected, energizing of the coil is not possible because the uniting clutch 10 becomes an open fault condition.

Figure 19:
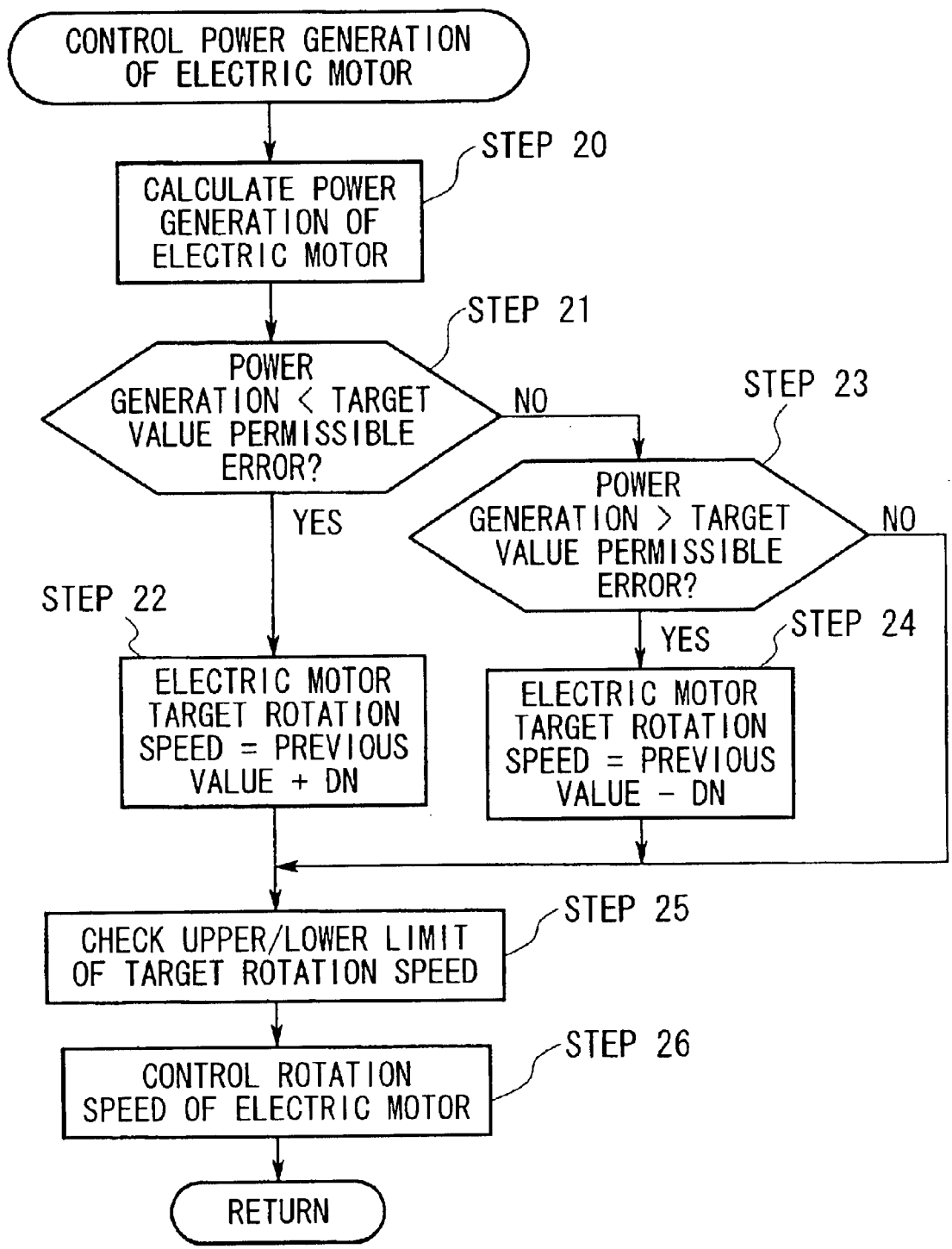
FIG. 19 is a flow chart showing a control flow for generator electric power generation in FIG. 18.

The electric power generation of the electric motor 3 will be explained using FIG. 19. FIG. 19 is a flow chart showing the electric motor power generation control flow in FIG. 18.

At first in step 20, the electric power generation is calculated for the electric motor 3 which is presently generating electric power. This can be easily calculated from the rotational speed or torque of the electric motor 3, the electric power generation efficiency or the like. Next in step 21, it is determined whether or not the electric power generation is less than a value for where a predetermined permissible error amount is subtracted from the target electric power generation. In the case where the electric power generation is less than this value, then in step 22, the target rotational speed of the electric motor 3 is changed to a value increased by a predetermined value $\Delta N$ from a previous value. Here the initial value of the target rotation speed of the electric motor 3 is set as shown in step 13 of FIG. 18, to the engine rotation speed.

Then, in step 25, it is determined whether or not the abovementioned target rotation speed of the electric motor 3 is within a range with a predetermined upper limit and lower limit. When the target rotation speed exceeds the upper limit, this is changed to the upper limit, while when this falls below the lower limit, this is changed to the lower limit. Then, in step 26, the electric motor 3 is rotation controlled so that the rotation speed of the electric motor 3 coincides with the target rotation speed. Here, since the torque of the auxiliary machine load, in this case the compressor drive torque, is determined by the relationship with the refrigeration cycle, it is difficult to change this freely. Consequently, as shown in FIG. 19, control of the electric power generation by the rotation speed of the electric motor is preferable.

In step 21, in the case where the electric power generation is greater than the abovementioned value, then in step 23, it is determined whether or not the electric power generation is greater than a value for where a predetermined permissible error amount is added to the target electric power generation. In the case where the electric power generation is greater than this value, then as shown in step 24, the target rotation speed of the electric motor 3 is changed to a value decreased by a predetermined value $\Delta N$ from a previous value, and the processing is then performed for the abovementioned step 25 and thereafter. Furthermore, in the case where the electric power generation is less than the value for where a predetermined permissible error amount is added to the target electric power generation, this means that the electric power generation is within a permissible error range for the target value, and there is no requirement to change the target rotation speed of the electric motor 3. Therefore processing is performed for step 25 and thereafter without change.

FIG. 20 is a condition explanatory diagram for the clutch or one-way clutch for each of the operating conditions, in a vehicle installed with the engine system of FIG. 17. As described above, in the engine stop condition, at the time of the engine stop (off) condition, the uniting clutch 10 (C1) is opened (off), and the motor 3 is stopped. At this time, the condition of the one-way clutch 11 (W1), the one-way clutch 13 (W2), and the one-way clutch 39 (C2) is unimportant.

Furthermore, in the engine stop condition, at the time of the compressor operation (on) condition, the C1 is opened (off), the W1 is free, the W2 is locked, and the C2 is connected (on). Then, the motor 3 is electrically driven in the reverse direction so that the compressor 4 is operated by the motor 3.

Moreover, at the time of the engine start condition, the C1 is open (off), the W1 is locked, and the W2 is free. Then the motor 3 is electrically driven in the normal direction. At this time, the condition of the C2 is unimportant.

Furthermore, in the engine operating condition, at the time of the compressor on condition, the C1 and C2 are on, and the W1 and W2 are free. Then, the motor rotates normally for electric drive or to generate electricity.

Moreover, in the engine operating condition, at the time of the compressor off condition, the C1 is on, the C2 is off, and the W1 and W2 are free. Then, the motor 3 rotates normally for electric drive or to generate electricity.

Figure 21:
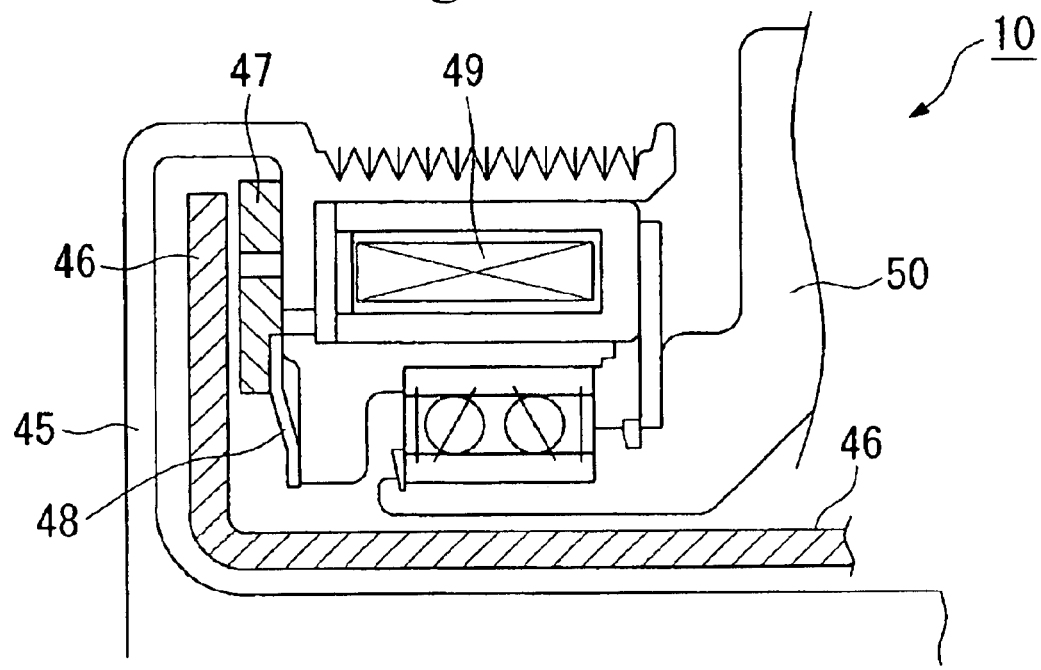
FIG. 21 is an explanatory diagram for a clutch used in the engine system according to another embodiment of the present invention.
Figure 22:
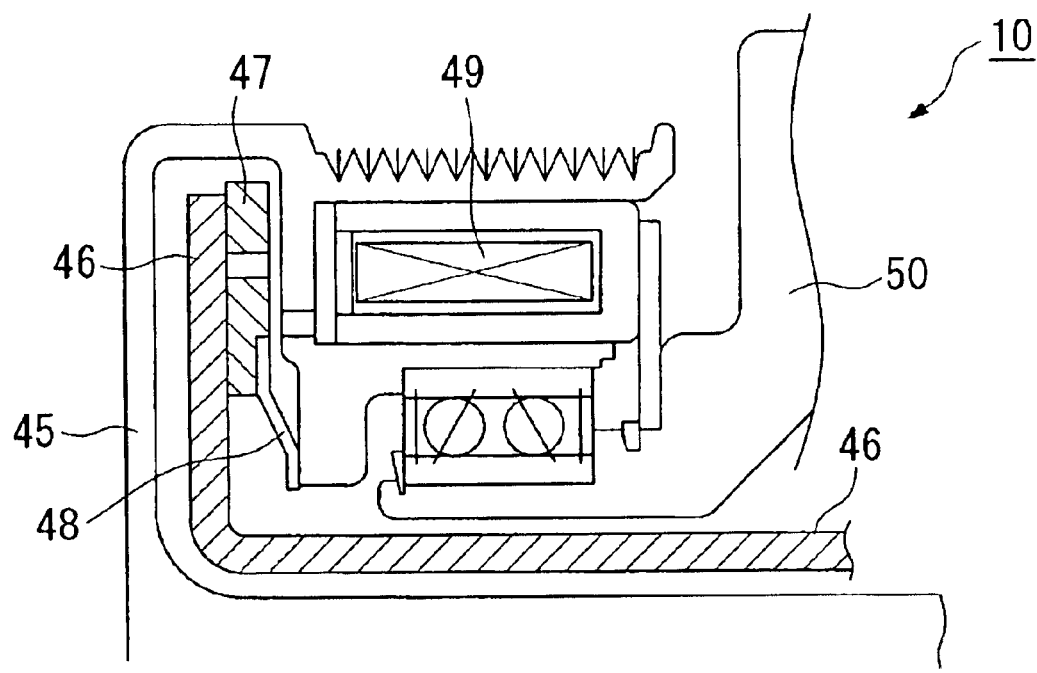
FIG. 22 is an explanatory diagram for a clutch used in the engine system according to another embodiment of the present invention.

Furthermore, in the engine system 1 shown in FIG. 17, the uniting clutch 10 may be constructed as shown below. FIG. 21 and FIG. 22 are explanatory drawings of the uniting clutch 10 for this case. As shown in these figures, a rotor 45 of the uniting clutch 10 is formed with a lower side portion in an approximate L-shape in cross-section, and an upper side edge is bent in an approximate C-shape in cross-section. The rotor 45 is formed with one side face thereof facing an inside side face on a lower side end portion, so as to cover a coil 49 of an approximate rectangular shape in cross-section. A solid shaft (not shown in the figure) is connected to the lower side end portion of the rotor 45, and the rotor 45 is connected to any of the three elements of the planetary mechanism via this shaft.

Moreover, on the inside of the rotor 45, a disk 46 of an approximate L-shape in cross-section is provided in a condition spaced apart from the rotor 45. A hollow shaft (not shown in the figure) is connected to the other end portion of this disk 46, and the disk 46 is connected to any of the three elements of the planetary mechanism via this shaft. Consequently, by uniting the disk 46 and the rotor 45, the three elements of the planetary mechanism are united.

Between the rotor 45 and the disk 46 is provided an armature 47 which is able to approach and separate to and from the disk 46 via a plate spring 48. The plate spring 48 has a lower end portion thereof connected to a tip end portion of the rotor 45, and applies a resilient force in the rotor [disk] 46 direction, to the armature 47 connected to the upper end portion. As a result, the armature 47, as shown in FIG. 22, is abutted against the disk 46 so that the disk 46 and the rotor 45 are united via the armature 47. Consequently the rotation of the rotor 45 is transmitted to the disk 46 via the armature 47, and the rotor 45 and the disk 45 rotate as one. Reference symbol 50 denotes a casing.

FIG. 21 shows the condition of the clutch 10 when energized. When energized, the coil 49 generates a magnetic field between the rotor 45 and the armature 47, and the armature 47 is attracted to the rotor 45 side by means of the magnetic field. In the case where the magnitude of the current at the time of energizing is above a constant, the strength of the magnetic field becomes above a constant, and as shown in FIG. 21, the armature 47 is attracted to the rotor side against the urging force from the plate spring 48. At this time, the uniting of rotor 45 and the disk 46 is released, to give the disconnected condition, and hence the rotation of the rotor 45 is no longer transmitted to the disk 46. In this manner, the uniting clutch 10 when energized becomes the disconnected condition, while when not energized becomes the connected condition. Therefore even in the case where the uniting clutch 10 cannot be energized, since the uniting clutch 10 maintains the connected condition, the motor 2 can generate electricity due to transmission of the engine torque to the motor 2 via the uniting clutch 10. Moreover if the uniting clutch 10 is energized only for the non connected condition, then in the case of the connected condition during normal vehicle travelling, it is not necessary to supply electric power to the connection device, and hence electric power consumption can be significantly reduced.

FIG. 23 is a flow chart showing a control flow during traveling of a vehicle installed with an engine system incorporating the clutch of FIG. 21. At first, in step 30 it is determined whether or not an open signal is being output from the uniting clutch. In the case where an open signal is being output, then in step 31 it is determined whether or not the rotation speed of the engine 2 is equal to or above a predetermined value. In the case where this is equal to or above the predetermined value, then in step 32 it is determined whether or not a fuel injection signal in step 32 is ON. In this case where the fuel injection signal is OFF, the series of processing ends as is, while in the case where this in ON, then in step 34 the engine operating condition is determined, after which in step 38 an open signal for the uniting clutch 10 is cut, and the series of processing ends.

Moreover, in step 31, in the case where the engine rotation speed is equal to or less than the predetermined value, then in step 33 it is determined whether or not the fuel injection signal is OFF. In the case where the fuel injection signal is ON, the series of processing ends as is, while in the case where this is OFF, then in step 35 the engine non operating condition is determined. Then, in step 36 it is determined whether or not the compressor operating signal is OFF. In the case of ON, the series of processing ends as is, while in the case of OFF, then in step 37 it is determined that the compressor is in the non operating condition during idle stop. Then, in step 38 the open signal for the uniting clutch 10 is cut, and the series of processing ends.

In the abovementioned step 30, in the case where the uniting clutch 10 is not outputting an open signal, then in step 40 it is determined whether or not the fuel injection signal is OFF. In the case where the fuel injection signal is ON, then the series of processing ends as is, while in the case of OFF, then in step 41 the engine non operating condition is determined. Then in step 42 it is determined whether or not the compressor signal is ON, and in the case of ON, then in step 44 it is determined to be during idle stop in the compressor operating condition. In the case where the compressor signal is OFF, then in step 43 it is determined whether or not the restart signal is ON. In the case of ON, then in step 45 restart mode is determined, while in the case of OFF, the series of processing ends. After the determination as in step 44 and step 45, then in step 46, the uniting clutch open signal is output, after which the processing ends.

FIG. 24 is a condition explanatory diagram for the clutch or one-way clutch for each of the operating conditions, in a vehicle installed with the engine system provided with the uniting clutch of FIG. 21. In the case of FIG. 24, compared to the case of FIG. 20, the ON and OFF control of C1 is reversed. Except that, in the case of compressor OFF in the engine stop condition, C1 is made OFF. In this case, since the engine system overall is in the stopped condition, either of the conditions of C1 ON or OFF is alright. Consequently, it is preferable to select the OFF (connection) condition where fuel consumption is even less.

As will be clear from the above description, the present invention demonstrates the following effects.

(1) By using the three elements of the planetary mechanism, drive of auxiliary machine while the engine is starting or the engine is stopped can be performed with a single motor. Moreover, drive of the auxiliary machine with the engine, electric power generation by using the motor as a generator, engine assist by the motor, and so on can also be carried out.

Consequently, it is possible to provide a simple apparatus which can achieve the abovementioned various drive modes with a minimum number of motors, thus demonstrating the effect that a reduction in cost can be achieved.

(2) By providing a rotation direction restriction device on the auxiliary machine drive shaft and the engine output shaft, reverse rotation of the auxiliary machine is prevented, giving the effect that reverse rotation of the auxiliary machine can be prevented, reliable starting of the engine by the motor and maintenance of the integrity of the auxiliary machine can be achieved, reverse rotation of the engine can be prevented, and reliable drive of the auxiliary machine by the motor can be achieved.

(3) By constructing the rotation direction restriction device by means of a one-way clutch, the rotation direction of the auxiliary machine drive shaft or the engine output shaft is restricted in one direction without carrying out any special control. Therefore this has the effect of enabling the abovementioned various operation modes to be achieved with a simple control.

(4) By making the auxiliary machine the compressor of the air conditioner, the air conditioner can be operated while the engine is stopped. Therefore this demonstrates the effect that for example the comfort of the space inside a cabin mounted on a hybrid vehicle or an idle stop vehicle, can be maintained while the engine is stopped.

(5) By connecting the engine output shaft to the carrier, and connecting the motor output shaft to the sun gear, it is possible transmit the rotation of the motor to the engine at reduced speed, giving the effect that starting of an engine for which a large torque is necessary at the time of starting, can be easily performed. Moreover, the motor can be used directly connected to the auxiliary machine which can be driven with a relatively small torque. Consequently, there is the effect that a comparatively small motor can be employed for generating a torque of a torque value level which is the higher of, a torque value necessary for driving the auxiliary machine, and a torque value for the engine starting torque reduced by the reduction ratio, and miniaturization and cost reduction can be achieved.

(6) By making the sun gear and the pinion gear approximately the same diameter, rotation speed of the pinion gear can be kept from becoming excessive. As a result, there is the effect that an increase in gear noise can be suppressed.

(7) Even in the case where the uniting connection device cannot be connected, the motor can be operated as a generator, and charging can be performed.

(8) Even in the case where the uniting connection device cannot be energized, electricity can be generated in the motor due to transmission of the engine torque to the motor. Moreover, if the connection device is energized only for a non connected condition, then in the case of the connected condition during normal vehicle travelling, it is not necessary to supply electric power to the connection device, and hence electric power consumption can be significantly reduced.

What is claimed is:

1. An engine system comprising an engine, a motor, and auxiliary machine, and further comprising:
   a planetary mechanism having three elements comprising a sun gear, a carrier and a ring gear, to which any one of an engine output shaft, a motor output shaft and an auxiliary machine drive shaft are respectively connected;
   a uniting connection device capable of uniting two or more elements of said planetary mechanism;
   a rotation direction restriction device which restricts a rotation direction of said auxiliary machine drive shaft to one direction; and
   a rotation direction restriction device which restricts a rotation direction of the engine output shaft to one direction.

2. An engine system according to claim 1, wherein said rotation direction restriction device which restricts the rotation direction of the engine output shaft to one direction is a one-way clutch.

3. An engine system according to claim 1, wherein said auxiliary machine is a compressor of an air conditioner.

4. An engine system according to claim 1, wherein
   said engine output shaft is connected to said carrier,
   said motor output shaft is connected to said sun gear, and
   said auxiliary machine drive shaft is connected to said ring gear.

5. An engine system according to claim 4, wherein
   said carrier is provided with a pinion gear which is engaged with said sun gear and said ring gear, and
   said pinion gear and said sun gear are formed in approximately the same diameter.

6. An engine system according to claim 1, wherein
   said uniting connection device is electrically operated, and said uniting connection device is disconnected when the device is an electrically energized state, and is connected when the device is in the other condition than the energized state.

7. An engine system comprising an engine, a motor and auxiliary machine, and further comprising:
   a planetary mechanism having three elements comprising a sun gear, a carrier and a ring gear, to which any one of an engine output shaft, a motor output shaft and an auxiliary machine drive shaft are respectively connected;
   a uniting connection device capable of uniting two or more elements of said planetary mechanism;
   a rotation direction restriction device which restricts a rotation direction of said auxiliary machine drive shaft to one direction; and
   an auxiliary machine connecting device capable of connecting or disconnecting said auxiliary machine and the planetary mechanism;
   wherein, when the engine is operating and when the uniting connection device cannot unite two or more elements of said planetary system, said auxiliary uniting connection device unites the auxiliary machine and the planetary mechanism.

8. An engine system according to claim 7, wherein said rotation direction restriction device which restricts the rotation direction of the auxiliary machine drive shaft to one direction is a one-way clutch.

9. A driving method of an engine system comprising an engine, a motor, auxiliary machine, and a planetary mechanism having three elements comprising a sun gear, a carrier and a ring gear, to which any one of an engine output shaft, a motor output shaft and an auxiliary machine drive shaft are respectively connected, and a rotation direction restriction device which restricts a rotation direction of said engine output shaft to one direction,
   wherein the driving method of the engine system comprising the steps of:
   starting the engine by the motor by rotating the motor out shaft to one direction while maintaining the auxiliary machine driving shaft at a standstill state;
   driving auxiliary machine by the motor by rotating the motor output shaft to the opposite direction while the engine output shaft is maintained at a standstill state;
   driving the auxiliary machine by the engine by uniting more than two elements of said planetary mechanism.

10. An engine starting device of an engine system comprising a planetary mechanism having three elements comprising a sun gear, a carrier and a ring gear, to which any one of an engine output shaft, a motor output shaft and an auxiliary machine drive shaft are respectively connected,
- a motor which is connected to one element of said planetary mechanism;
- a uniting connection device capable of connecting more than two elements of said planetary mechanism;
- a rotation direction restricting device capable of restricting the rotation direction of one element of the planetary mechanism which is connected to the auxiliary machine drive shaft to one direction; and
- a rotation direction restricting device capable of restricting the rotation direction of the engine output shaft to one direction.

11. A starting apparatus for an engine comprising:
- a planetary mechanism having three elements comprising a sun gear, a carrier and a ring gear, wherein one of said three elements is directly connected to an engine output shaft, and a second of said three elements is directly connected to an auxiliary machine drive shaft;
- a motor connected to the remaining one element of said planetary mechanism;
- a uniting connection device capable of uniting two or more elements of said planetary mechanism; and
- a rotation direction restriction device capable of restricting rotation directions of elements connected to said auxiliary machine drive shaft to one direction.

* * * * *